Dec. 9, 1969    T. E. KIRK    3,483,458
ROTOR POSITION SENSOR AND CONTROL CIRCUIT FOR AN
ELECTRIC MOTOR POWER SUPPLY
Filed Sept. 27, 1968    7 Sheets-Sheet 1

INVENTOR.
Thomas E. Kirk
BY
Robert W. Smith
ATTORNEY

INVENTOR.
Thomas E. Kirk
BY
Robert W. Smith
ATTORNEY

Dec. 9, 1969　　　　　　　　T. E. KIRK　　　　　　　3,483,458
ROTOR POSITION SENSOR AND CONTROL CIRCUIT FOR AN
ELECTRIC MOTOR POWER SUPPLY
Filed Sept. 27, 1968　　　　　　　　　　　　　　　7 Sheets-Sheet 3

INVENTOR.
Thomas E. Kirk
BY
Robert W. Smith
ATTORNEY

Dec. 9, 1969 T. E. KIRK 3,483,458
ROTOR POSITION SENSOR AND CONTROL CIRCUIT FOR AN
ELECTRIC MOTOR POWER SUPPLY
Filed Sept. 27, 1968 7 Sheets-Sheet 4

SIX POLE MOTOR DISK

INVENTOR.
Thomas E. Kirk
BY
Robert W. Smith
ATTORNEY

United States Patent Office 3,483,458
Patented Dec. 9, 1969

3,483,458
ROTOR POSITION SENSOR AND CONTROL CIRCUIT FOR AN ELECTRIC MOTOR POWER SUPPLY
Thomas E. Kirk, Anderson, Ind., assignor to General Motors Corporation, Detroit, Mich., a corporation of Delaware
Continuation-in-part of application Ser. No. 629,709, Apr. 10, 1967. This application Sept. 27, 1968, Ser. No. 763,124
Int. Cl. H02p 5/40
U.S. Cl. 318—138                12 Claims

ABSTRACT OF THE DISCLOSURE

In a preferred form, variable commutation control of a brushless electric drive motor is provided in a motor power supply comprising a switching circuit formed by gate controlled semiconductor switches. The motor armature windings are sequentially energized from an electrical power source through the semiconductor switches which are biased conductive in response to rotation of the motor rotor. A rotor position sensor has a disk secured to the rotor shaft of the motor and six stationary pickup sensors that are responsive to the disk's rotation such that amplitude varying voltage signals are produced which are linearly related to rotor position. A trigger control circuit is also provided which is connected between the pickup sensors and the gate electrodes of the semiconductor switches. The trigger control circuit develops a plurality of gating pulses that are responsive to both the amplitude of the pickup signals and motor speed. Gating of the semiconductor switches is controlled so that variable motor commutation angles are produced with motor speed changes by varying the instant at which the respective armtaure phase windings are energized in response to the motor rotor position.

---

This is a continuation-in-part application of Ser. No. 629,709, Thomas E. Kirk, for a "Position Sensor and Control Circuit for an Electric Motor Power Supply," filed Apr. 10, 1967. The invention herein described was made in the course of work under a contract or subcontract thereunder with the Department of Army.

This invention relates to brushless motors and more particularly the invention is directed to an improved brushless motor commutation control arrangement and is related to U.S. Patent No. 2,297,926 to Campbell et al., for a "Vehicle Propulsion and Control System," issued Jan. 10, 1967, and assigned to the assignee of this application.

Typically, in dynamoelectric machines there are two magnetic fields produced in which one is associated with a stationary part or stator and the other is associated with a rotating part or rotor. In an electric motor, in order to produce a torque at the motor shaft the two magnetic fields must be established in a predetermined relationship. One general type of electric motor includes a first magnetic field that is produced by either permanent magnets or coil conductors excited from a direct current source. In the latter case the coil conductors form the motor field winding which produces a magnetic field that is stationary with respect to either the rotor or stator parts. A second magnetic field is developed by coil conductors associated with the other of the motor parts. These coil conductors are designated armature windings and are energized in response to rotation of the rotor to produce the armature magnetic field. This provides current in a given direction through the armature conductors when they have a predetermined geometrical relationship to the motor field. Because the first or motor field is stationary with its associated motor part, current which generates the second or armature field must be periodically reversed through the conductors of the armature winding to maintain the predetermined orientation between the two magnetic fields.

Accordingly, a commutation arrangement is required to energize the armature windings with direct current voltage such that the armature conductors are supplied current of a proper polarity at the proper instant with respect to the rotor position. Commutator mechanisms including rotor segments and brushes are well known to provide motor commutation and recently, increased use of switching circuits including gate controlled semiconductor switches of the transistor and controlled rectifier types have been used to replace commutator mechanisms. Semiconductor switches have made such switching circuits in brushless motor systems practical because of their size, relatively high power handling capacity and fast switching responses.

The semiconductor switches are normally connected in a matrix of one or more groups of switching pairs between a power supply source and the motor input. These pairs of semiconductor switches are biased conductive in a switching sequence in response to the position of the motor rotor. Current is thereby conducted to the motor armature windings so as to provide the same operation as provided by commutator mechanisms. Some of the readily apparent advantages of providing commutation of brushless motors by a switching circuit are static electronic switching rather than mechanical switch operations, elimination of brush sparking, as well as reduced maintenance and servicing otherwise required by commutator and brush mechanisms.

In the brushless motor disclosed in the above-identified Patent No. 3,297,926, a polyphase armature winding is wound on the stator and the motor field is developed in the motor rotor. A switching circuit is provided in the motor power supply that includes a matrix of semiconductor switches. Gating of the semiconductor switches is controlled by a commutation control arrangement including a disk having rectangular apertures which is mounted on the motor shaft. As the disk rotates, substantially rectangular shaped voltage signals are developed in inductive type pickup sensors. These signals are amplified and are applied as gating signals to the gate or trigger electrodes of the semiconductor switches. Current produced by a power supply voltage source is conducted through the semiconductor switches to the input of the armature windings. The semiconductor switches are gated so as to develop polyphase armature input voltages in accordance with a switching sequence that is controlled by the sequence at which pickup sensor signals are produced. These semiconductor switches are also gated conductive at substantially the same relative positions of the rotor and are provided with equal conduction periods as determined by the width of the disk apertures. Therefore, the relationship between the input voltage applied to the armature windings and rotor position or the commutation angle is controlled by being maintained substantially fixed.

The present invention is directed to providing an additional feature to brushless drive motor power supplies wherein motor commutation is variable in response to the motor operation. The control of motor commutation becomes important when the relationship or orientation of the motor magnetic fields associated respectively with the stator and rotor become distorted because of motor load conditions. Distortion occurs because of changes in armature reaction and self-inductance voltages developed in the armature windings which distortion varies with motor operation including motor speed. Accordingly, the motor is often operated less efficiently at higher speeds than at lower speeds. In electric vehicular drive systems, a brushless vehicle drive motor is operated over widely varying speed ranges while the maximum voltage and current limits of the electrical power source are substantially fixed. Therefore, a brushless drive motor is operated more efficiently by the commutation control arrangement of this invention which varies the motor commutation in response to motor speed. Control of the motor commutation provides control of the orientation of the armature field relative to the motor field so that more efficient motor operation is provided thereby permitting reduction of the size of both the electrical power source and the semiconductor switches.

In carrying out the present invention a rotor position sensor is provided in a housing that is attached to a brushless motor and includes a disk mounted on the motor shaft and a plurality of pickup sensors. The disk is formed with arcuate sides that are arranged to produce pickup sensor signals which vary in amplitude relative to each rotor position. The signals are in the form of substantially triangular wave-shaped voltages which are applied to a trigger control circuit. The trigger control circuit receives the triangular voltages and produces gating pulses in accordance with rotor position.

The gating pulses have a fixed although adjustable pulse width and are produced in a sequence corresponding to that of the sensor voltage signals. A gating pulse is generated when the amplitude of a sensor voltage signal exceeds predetermined voltage reference levels of first and second bistable comparator circuits provided in the trigger control circuit. The voltage reference levels are determined by both a motor speed responsive signal and the predetermined conduction period during which each semiconductor switch is to be biased conductive. A change of motor speed will vary the voltage reference level in both bistable comparator circuits so that the gating signals will be produced earlier or later with respect to the rotor position while maintaining substantially the same gating signal pulse width. Advance of the gating signals correspondingly advances the commutation of the motor or the commutation angle which is directly related to the instant when current is supplied to the armature windings relative to the rotor position.

Since the switching circuit supplies polyphase armature windings, the semiconductor switches are connected in a matrix that forms a commutation switching circuit that develops a polyphase voltage output when biased conductive in predetermined pairs by the trigger control circuit gating pulses. The pickup sensors are mounted with predetermined angular spacings adjacent the disk so that the pickup sensor signals are developed in a predetermined sequence. Accordingly, predetermined pairs of semiconductor switches are biased conductive at an instant related to rotor position whereby voltage of a given polarity is applied to the input terminals of the motor armature phase windings relative to the motor field.

It is an object of this invention to provide an improved power supply for a brushless motor that provides commutation control in response to an operating load condition of the motor.

A further object of this invention is to provide a commutation angle control to compensate for magnetic field distortion in a brushless electric motor which includes a rotor position sensor that produces amplitude varying electrical signals which vary with changes in the position of the motor rotor.

A still further object of this invention is to provide motor commutation control with a rotor position sensor having both a disk formed with arcuate sides and a plurality of pickup sensors which sequentially produce linearly varying voltage signals that are applied to a trigger control circuit that produces gating signals for sequentially biasing predetermined pairs of switching devices of a motor power supply.

A further object of this invention is to provide in a power supply for a variable speed brushless motor a source of rotor position responsive signals having a predetermined sequence and a trigger control circuit for developing a plurality of gating pulses for controlling a semiconductor switching circuit that develops a polyphase input motor voltage in which the input voltages are formed by direct current power pulses having an adjustable pulse duration and a variable phase relationship to the motor rotor position in accordance with changes in motor speed.

Further objects and advantages of the present invention will be apparent from the following description, reference being had to the accompanying drawings wherein preferred embodiments of the present invention are clearly shown.

FIGURE 1 is a general schematic circuit diagram of a power supply system for a brushless motor utilizing the rotor position sensor and trigger circuit control of this invention.

FIGURE 2 includes an upper graph that illustrates the conduction sequence of the power supply commutation switching circuit and a lower graph illustrating the corresponding voltages applied to the motor armature windings shown in FIGURE 1.

Figure 1:
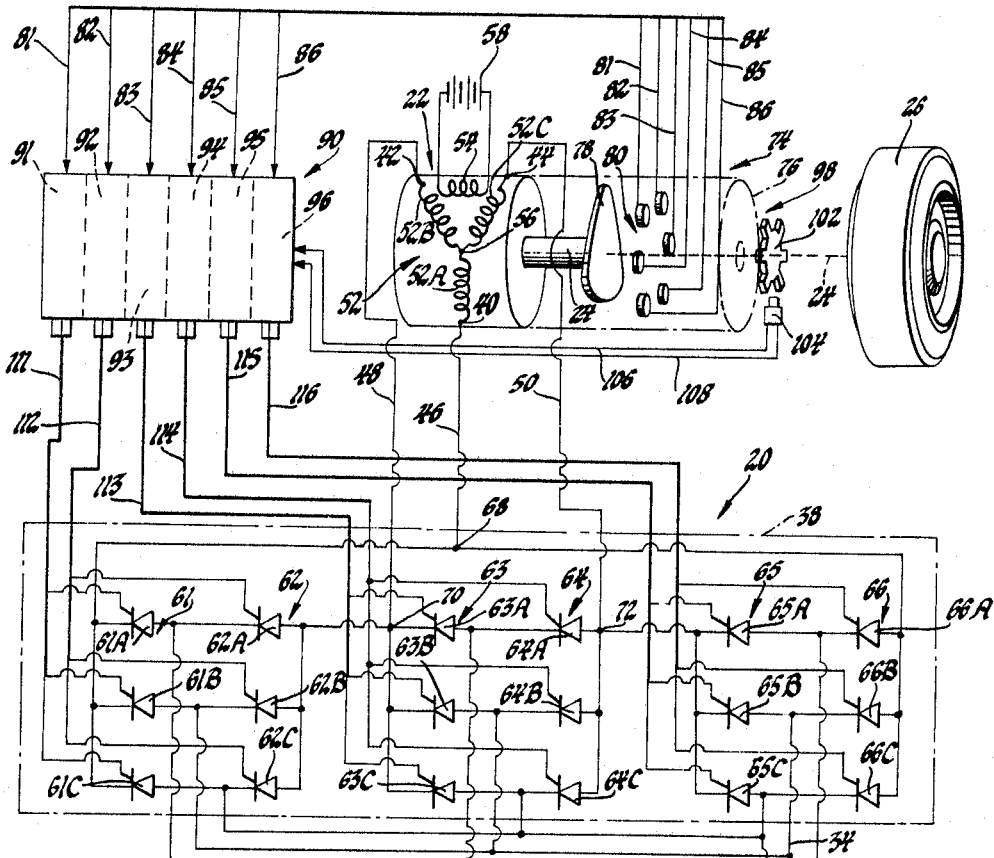
Figure 7:
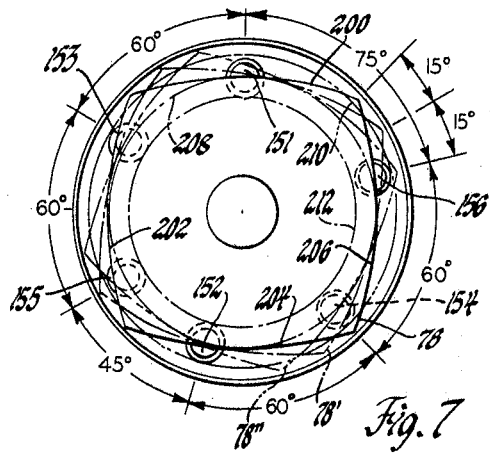
FIGURE 7 is a diagram of a disk for an eight pole motor and the corresponding position of the pickup sensors arranged in accordance with the present invention.
Figure 9:
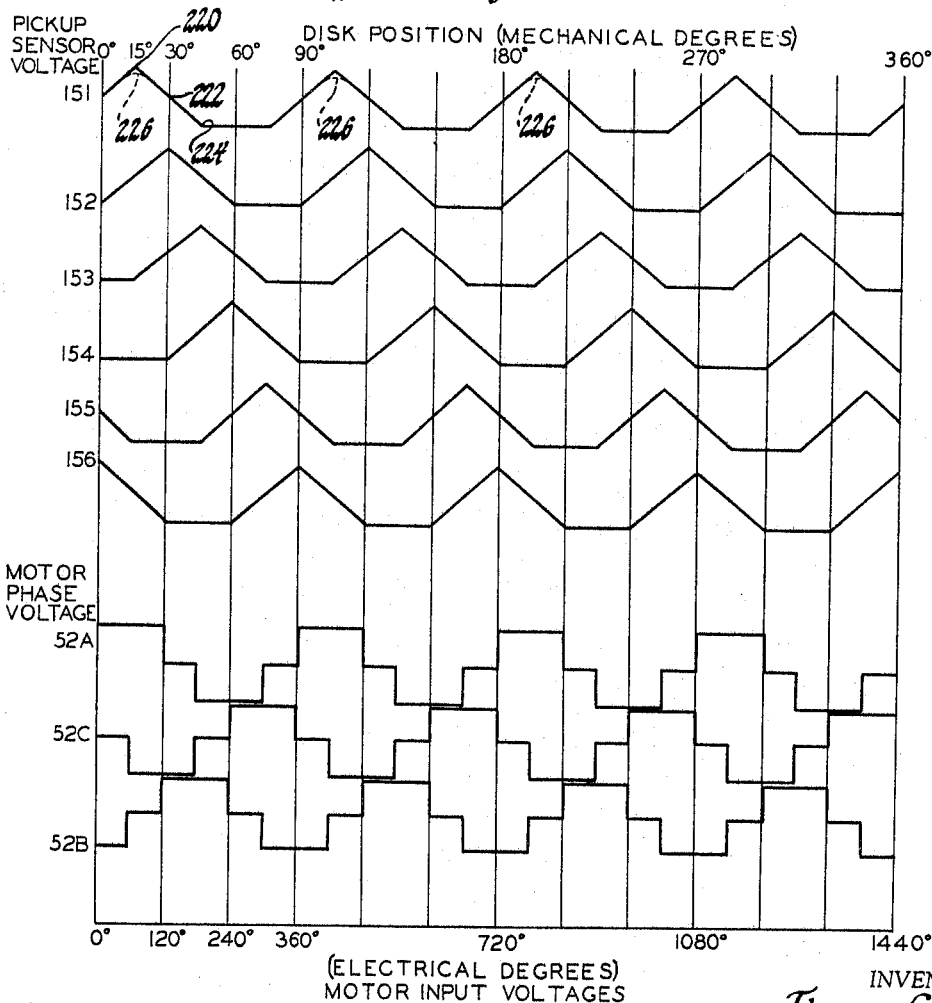

FIGURE 9 includes an upper graph illustrating wave forms sequentially produced by the pickup sensors arranged as illustrated in FIGURE 7 and a lower graph illustrating the corresponding voltages applied to the armature phase windings by the power supply system of FIGURE 1.

Figure 10:
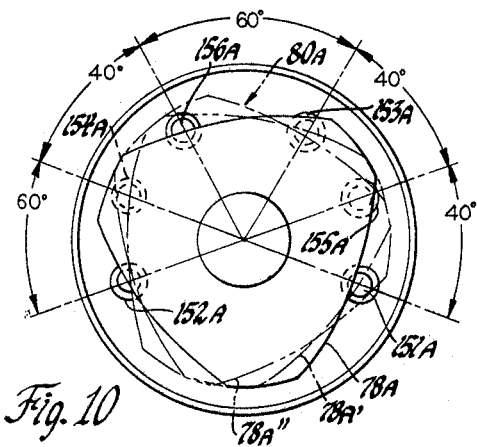

FIGURE 10 is a diagram of a rotor disk for a six pole motor and the corresponding position of the pickup sensors arranged in accordance with the present invention.

Figure 11:
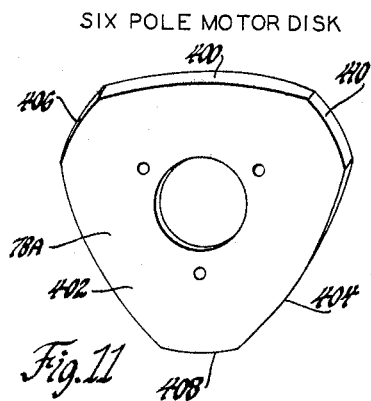

FIGURE 11 is a perspective view of the rotor disk of FIGURE 10.

Figure 12:
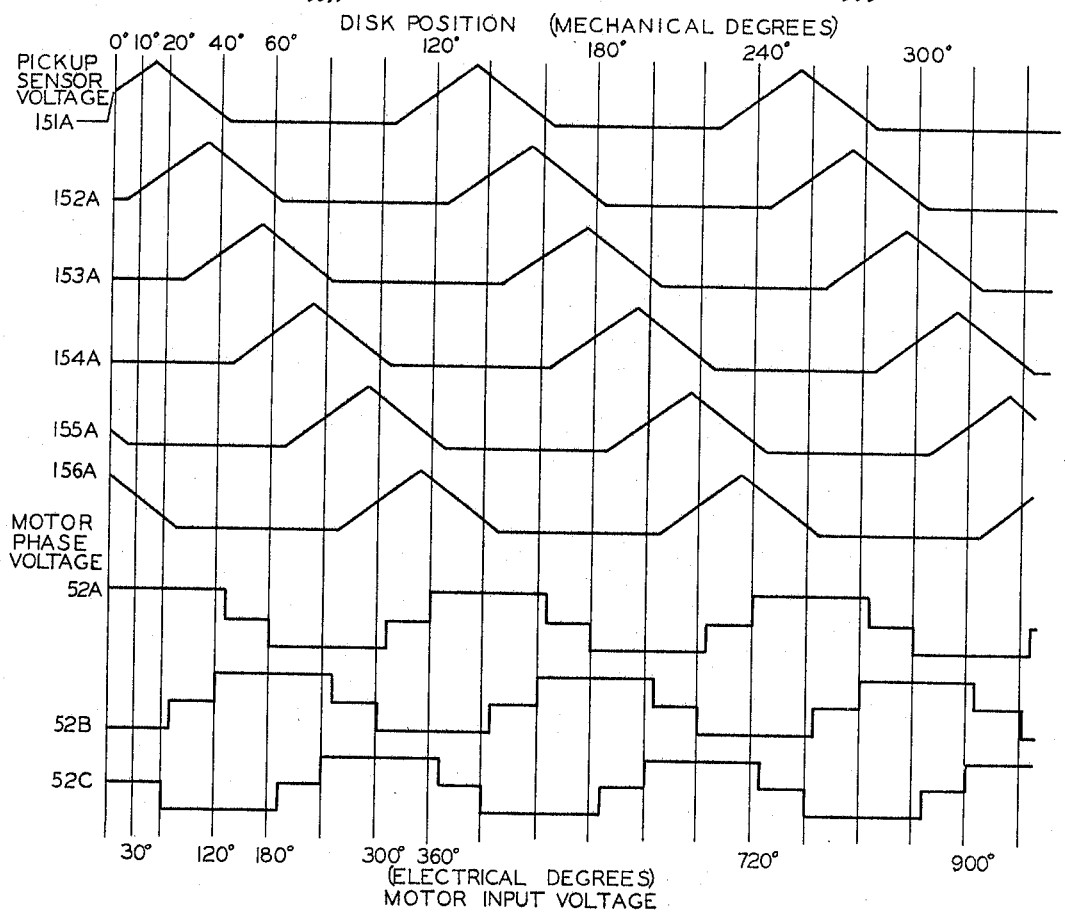

FIGURE 12 includes an upper graph illustrating wave forms sequentially produced by the pickup sensors arranged as illustrated in FIGURE 10 and a lower graph illustrating the corresponding voltages applied to the armature phase windings by a modified embodiment of the power supply of FIGURE 1.

Figure 13:
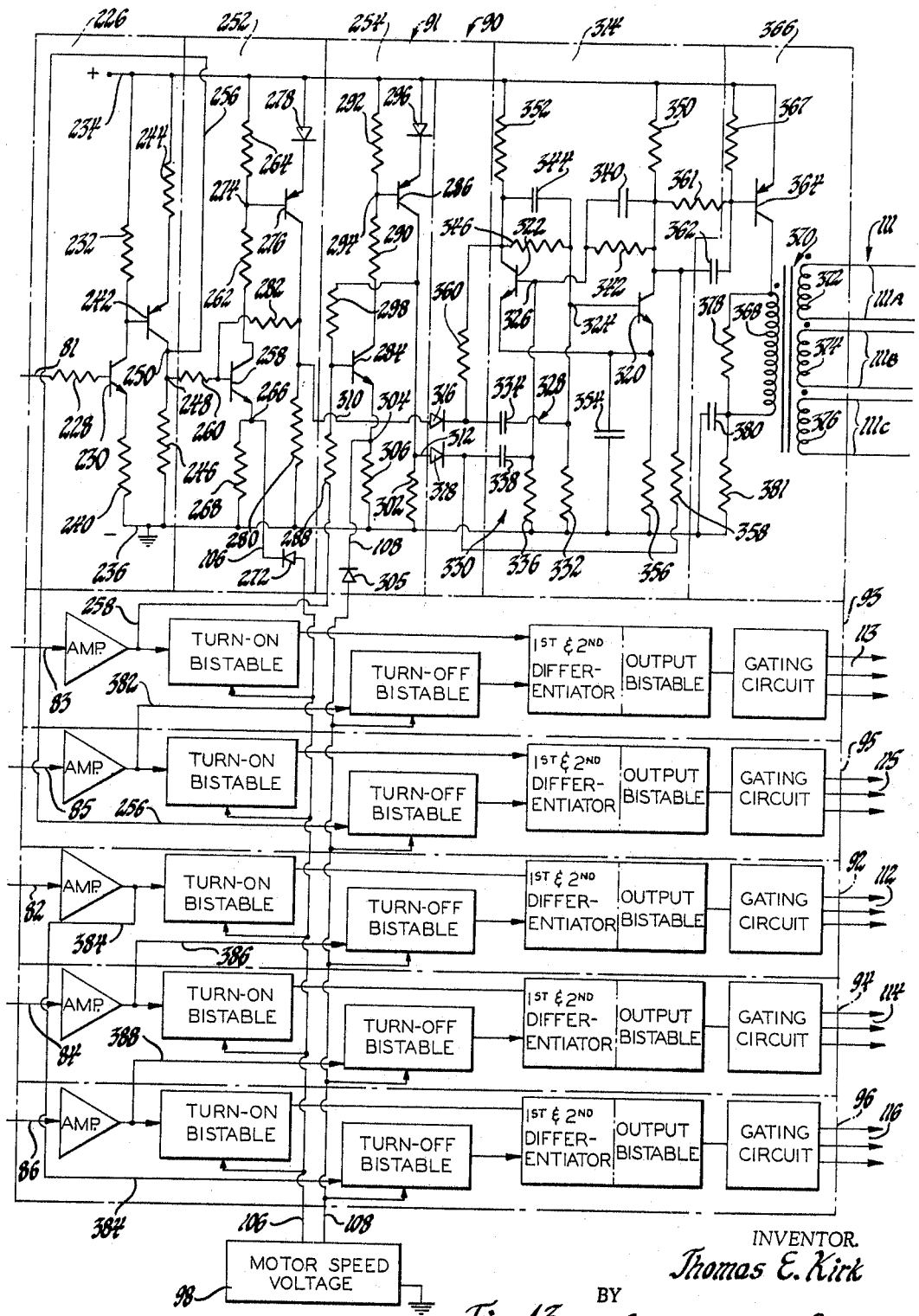

FIGURE 13 is a block circuit diagram of the trigger control circuit of the present invention including six circuit channels of which one channel is shown in a detailed schematic diagram.

Figure 14:
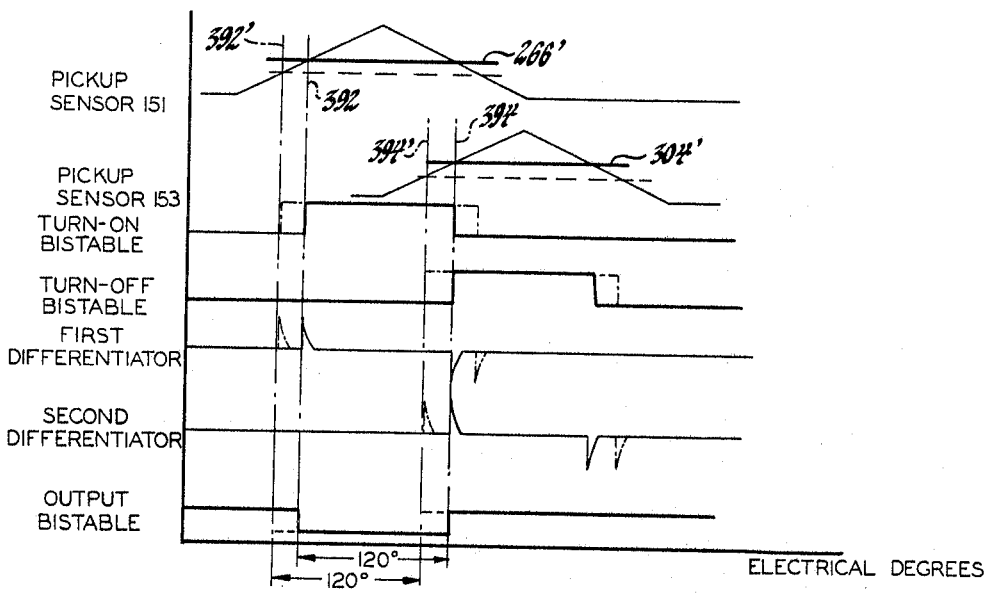

FIGURE 14 illustrates a graph of wave forms produced by the operation of one of the trigger control channels illustrated in FIGURE 13.

Figure 15:
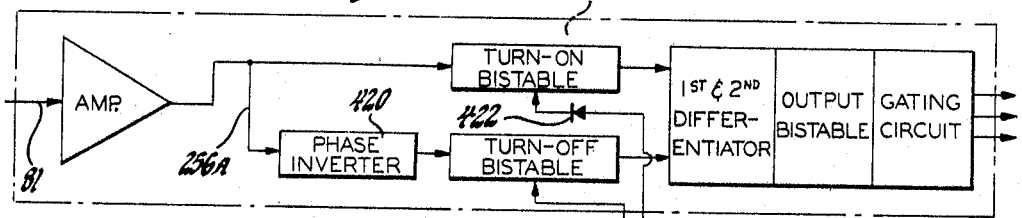

FIGURE 15 is a block diagram of an alternative embodiment for a trigger control circuit channel to replace each of the channels illustrated in the block diagram of FIGURE 13.

Figure 16:
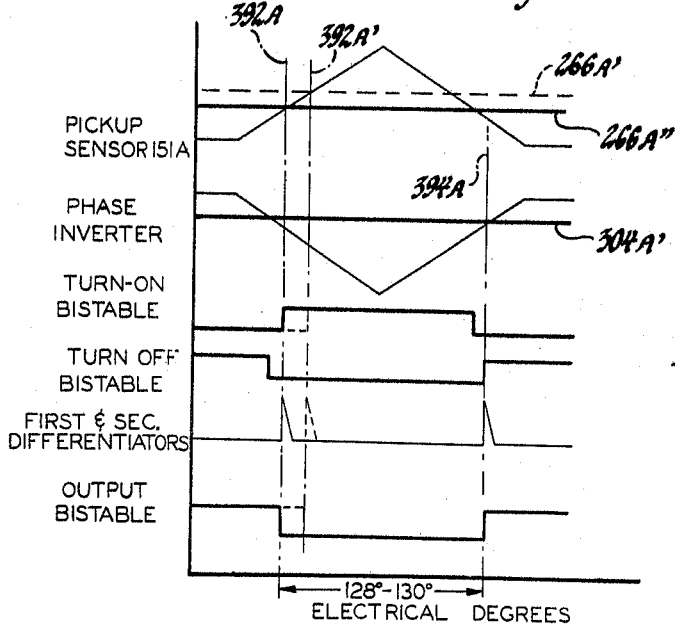

FIGURE 16 illustrates a graph of wave forms produced by the operation of the circuit of FIGURE 15.

Figure 17:
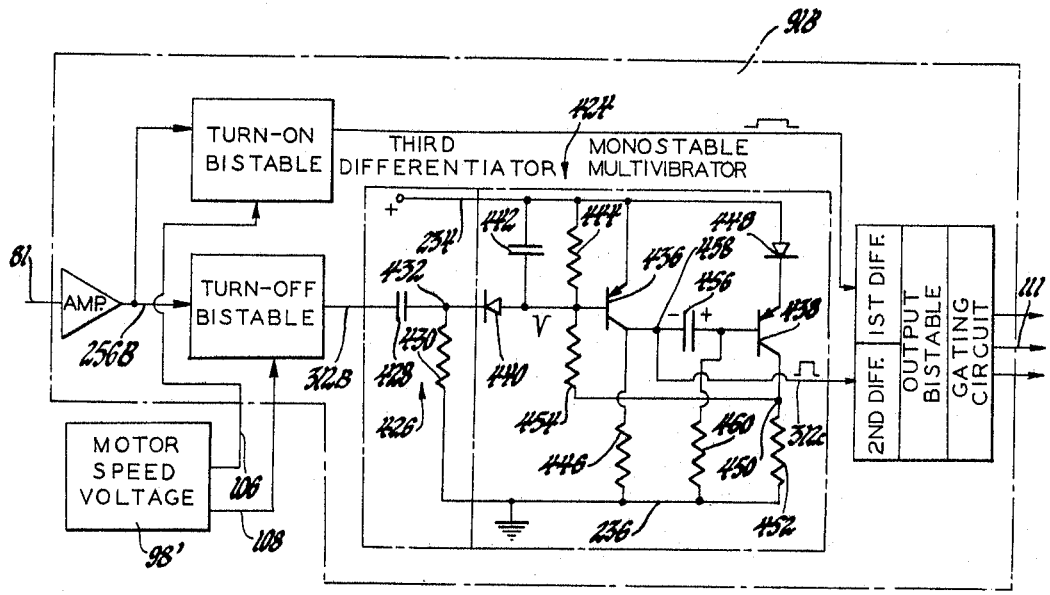

FIGURE 17 is a block diagram of a further alternative embodiment to replace each of the trigger control circuit channels illustrated in FIGURE 13.

Figure 18:
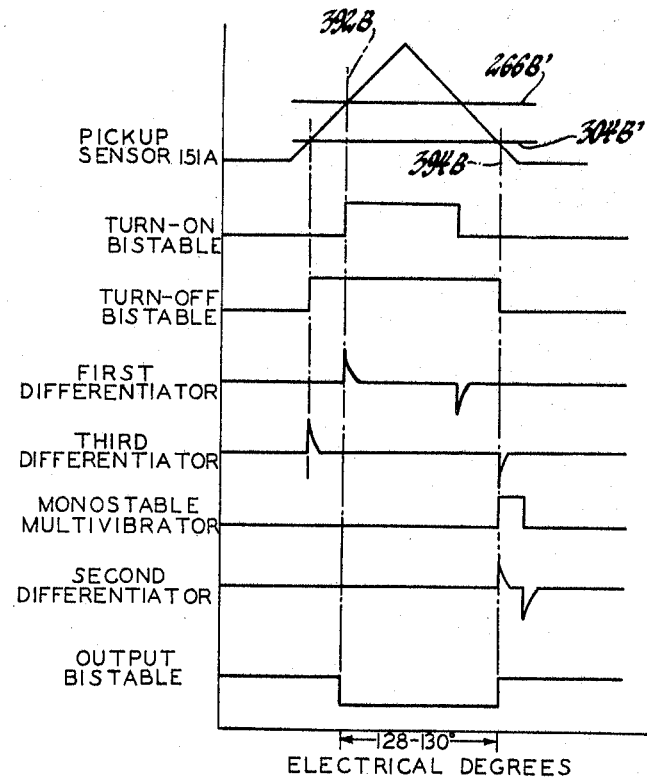

FIGURE 18 illustrates a graph of wave forms produced by the operation of the circuit of FIGURE 17.

Referring now to the drawings wherein FIGURE 1 illustrates a general circuit diagram of a motor power supply system generally designated by numeral 20 including a commutation control arrangement made in accordance with the present invention for supplying a brushless drive motor 22. The motor 22 has an output shaft 24 adapted for connection in driving relationship to a variable speed load provided by a vehicle wheel designated 26.

The power supply system 20 includes an electrical power source provided by an alternating current generator or alternator 28. The alternator 28 is driven by a prime mover 30 which, for example, includes a conventional gasoline internal combustion engine. A three phase output voltage of alternator 28 is supplied to conductors designated 32, 34 and 36. A commutation switching circuit designated 38 is connected between the generator output conductors 32, 34 and 36 and motor input terminals 40, 42 and 44. The motor input terminals 40, 42 and 44 are respectively connected to the output voltage of the switching circuit 38 by conductors 46, 48 and 50.

The electrical circuit of motor 22 includes an armature winding 52 and field winding 54. The armature winding 52 comprises three phase windings designated 52A, 52B and 52C wound in a conventional three-phase Wye configuration with a common or neutral connection 56. The inputs to the armature phase windings 52A, 52B and 52C are respectively connected to motor terminals 40, 42 and 44. The field winding 54 is connected to an external direct current source 58 which provides the field winding excitation.

Before generally describing the commutation control arrangement of this invention which controls the switching circuit 38 in response to the operation of motor 22, the motor and switching circuit are described hereinafter to aid in understanding the novel arrangement of the invention.

The brushless motor 22 is of the type disclosed in the above-mentioned Patent 3,297,926 wherein the field winding 56 is wound on a rotor carried by shaft 24. Winding 54 is supplied direct current through slip rings, not shown, to produce a motor filed flux in the magnetic circuit of the rotor. In another motor of this general type, which is described more fully in the copending application S.N. 587,427, filed Oct. 5, 1966, and assigned to the assignee of this invention, a so-called solid rotor construction is utilized wherein the field winding 54 is wound on portions of the motor stator. The stationary field winding 54 also produces a field flux in the magnetic circuit of the rotor. In either motor arrangement, the motor 22 includes an armature winding 52 that develops a stator flux and a field winding 54 that develops a motor field flux which rotates with the rotor.

The switching circuit 38 applies voltages to the respective inputs of motor 22 that have the same sequence as that provided by the switching circuit disclosed in the aforementioned Patent 3,297,926 and this sequence is also described further hereinbelow. The patent discloses a direct current electrical power source rather than a three-phase voltage power source such as that provided by alternator 28. Accordingly, the switching circuit 38 is modified to receive three phase alternating current voltages. Six groups of switching devices designated 61, 62, 63, 64, 65 and 66 replace six single switching devices required for operation from a direct current source.

Each group of switching devices includes three semiconductor switches of the controlled rectifier type, having a gating electrode. The individual controlled rectifiers are designated by the corresponding numeral indicating a given group of switching devices followed by a letter designation A, B or C. For example, the first group of switching devices 61 includes controlled rectifiers 61A, 61B and 61C and the controlled rectifiers of the remaining groups 62 through 66 are designated in the same manner. A switching circuit matrix is formed by connecting the anode of each controlled rectifier of group 61 respectively to the cathode of a corresponding controlled rectifier of group 62, i.e., the anode of controlled rectifier 61A is connected to the cathode of controlled rectifier 62A. In a similar manner the anodes of the controlled rectifiers of group 63 are connected to the cathodes of the corresponding controlled rectifiers of group 64 and the anodes of the controlled rectifiers in group 65 are respectively connected to the cathodes of the corresponding controlled rectifiers of group 66.

The alternator output conductors 32, 34 and 36 are respectively connected to a junction between one of the connections formed between a pair of controlled rectifiers just described. Accordingly, conductor 32 is connected between controlled rectifiers 61A and 62A, conductor 34 is connected between controlled rectifiers 61B and 62B, and conductor 36 is connected between controlled rectifiers 61C and 62C. In the same manner, the conductors 32, 34 and 36 are respectively connected between a pair of controlled rectifiers of groups 63 and 64 and between a corresponding pair of controlled rectifiers of groups 65 and 66.

The output of the switching circuit 38 is formed by junctions 68, 70 and 72 respectively connected to the remaining controlled rectifier power electrodes. The junction 68 is connected to each cathode of the controlled rectifiers of group 61 and to each anode of the controlled rectifiers of group 66. The junction 70 is connected to the anodes of each of the controlled rectifiers of group 62 and to each of the cathodes of the controlled rectifiers in group 63. Likewise, junction 72 is connected to the anodes of the controlled rectifiers of group 64 and the cathodes of the controlled rectifiers of group 65. The output junctions 68, 70 and 72 are further connected respectively to conductors 46, 48 and 50 connected to the input terminals of motor 22.

In the circuit matrix just described, the phase windings 52A, 52B and 52C are respectively supplied current of positive polarity through groups of switching devices 61, 63 and 65 and negative polarity or opposite armature current through groups of switching devices 62, 64 and 66 respectively. The switching circuit 36 effectively forms a frequency converter circuit matrix that corresponds to a three phase full wave rectifier. The controlled rectifiers of the respective groups of switching devices are selectively switched *on* in conductive pairs to produce positive and negative motor input voltage power pulses in a basic three phase sequence.

Figure 2:
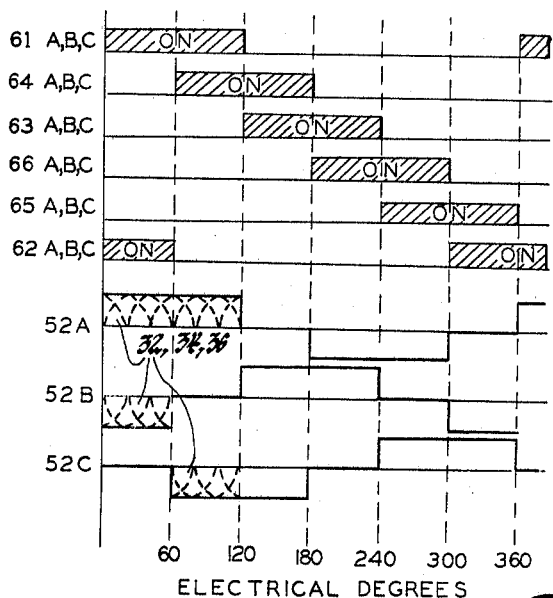

FIGURE 2 illustrates in the upper graph the time sequence in electrical degrees of the conduction order of the controlled rectifiers of the groups of switching devices. The lower graph of FIGURE 2 illustrates the corresponding time graphs of the voltage applied across armature phase windings 52A, 52B and 52C. This voltage is in a three phase voltage sequence which is disclosed in the above-mentioned Patent No. 3,297,926. The sequence is provided by the controlled rectifiers of the switching circuit 38 being switched *on* during the shaded periods shown in the upper switching sequence graph of FIGURE 2. The groups of switching devices are made conductive in the following sequence of conductive pairs 61–62, 64–61, 63–64, 66–63, 65–66, 62–65, During each shaded period, a gating pulse voltage is provided which biases all the gate electrodes of the three controlled rectifiers of one group positive relative to the cathode electrode. This basic sequence provides voltage to the respective conductors 46, 48 and 50 such that any instant two armature phase windings are energized in series. Accordingly, the voltage across armature phase windings 52A, 52B and 52C has one voltage polarity for 120 electrical degrees followed by a sixty electrical degree *off* period. To complete a 360 degree electrical cycle, the voltage is supplied in an opposite polarity for 120 electrical degrees followed by a 60 electrical degree *off* period and then the cycle repeats. As one phase winding is energized in one direction, current flows in an opposite direction through a second phase winding for sixty electrical degrees and then through a third phase winding for the remaining sixty degrees. Although in the basic sequence illustrated the voltage is applied for 120 electrical degree periods, in one preferred embodiment this is varied by extending the period to slightly over 120 electrical degrees so that there is an overlap of periods as described more fully hereinbelow.

The voltage supplied from the alternator 28 through the switching circuit 38 is ideally a direct current voltage of substantially constant amplitude, although in practice there is some voltage ripple. The alternator three phase output voltages on conductors 32, 34 and 36 are indicated by the three phase voltages illustrated by dashed lines drawn in the 0–120 electrical degree period in the lower graph of FIGURE 2. It is to be understood that each 120 electrical degree period, which is illustrated with an ideal wave shape, is produced by the sum of the rectified three phase alternator voltages.

While the controlled rectifiers receive a gating pulse for 120 electrical degrees in the illustrated sequence, each controlled rectifier of a group conducts only part of the conduction period since it is poled in the reverse direction as the alternator phase voltage reverses several times during a 120 electrical degree period. Only a slight voltage ripple occurs in the rectified voltage since the alternator frequency is substantially higher than the operating frequency of the motor 22. For example, when the brushless drive motor 22 is of an eight-pole type and is operated at an upper speed of 9,000 r.p.m. the motor voltage frequency will be 600 c.p.s. The alternator 28 produces a voltage having a frequency in the order of 2,700 c.p.s. so that at this motor frequency there are approximately four and one-half cycles of generator voltage for each complete cycle of motor voltage. For a given generator output frequency, when the motor speed decreases there is an increase in the frequency ratios between generator frequency and motor frequency so that even lower voltage ripple occurs.

The present invention is not limited to the commutation switching circuit 38 illustrated in FIGURE 1 and it is to be understood that a direct current source can replace the alternator 28 with the six groups of switching devices 61–66 replaced by six switching devices arranged to receive a direct current input.

Referring now to the commutation control arrangement of this invention, an arrangement is provided therein for controlling the switching sequence of the groups of switching devices 61–66 as described hereinabove in response to rotor position. A rotor position sensor generally designated 74 is included within a housing 76 attached to one end of motor 22. The rotor position sensor 74 includes a disk 78 mounted on the motor shaft 24 which carries the rotor of motor 22. An arrangement of six pickup sensors, generally designated by numeral 80, is responsive to the rotation of the disk 78 such that six voltage signals are developed during a complete rotation of the disk. These voltage signals are applied to conductors designated 81, 82, 83, 84, 85 and 86.

The commutation control arrangement also includes a trigger control circuit generally designated 90 which includes six identical circuit channels 91, 92, 93, 94, 95 and 96 and the arrangement further includes a source of reference voltage designated 98 which is responsive to motor operation. Each of the circuit channels 91 through 96 is respectively connected to one of the conductors 81 through 86 to receive a voltage signal produced in an associated pickup sensor.

The source of reference voltage is provided by a motor speed detector of the tachometer generator type which includes a disk 102 having plural tooth projections and a stationary magnetic pickup circuit arrangement 104. The circuit arrangement 104 converts voltage pulses which are developed by rotation of the disk 102 into a pair of direct current voltages. The D.C. motor speed signals are applied through the conductors 106 and 108 to each of the respective circuit channels 91–96 of trigger control circuit 90.

The electrical outputs of the circuit channels 91 through 96 are connected to groups of three conductors, each group being designated respectively 111, 112, 113, 114, 115 and 116. Each conductor supplies a gating pulse that is a voltage suitable to bias the gate electrode more positive with respect to the cathode of each controlled rectifier. The same gating signal is applied to all controlled rectifiers of a group of switching devices so that they are simultaneously biased for conduction in accordance with the switching sequence indicated in FIGURE 2.

Figure 6:
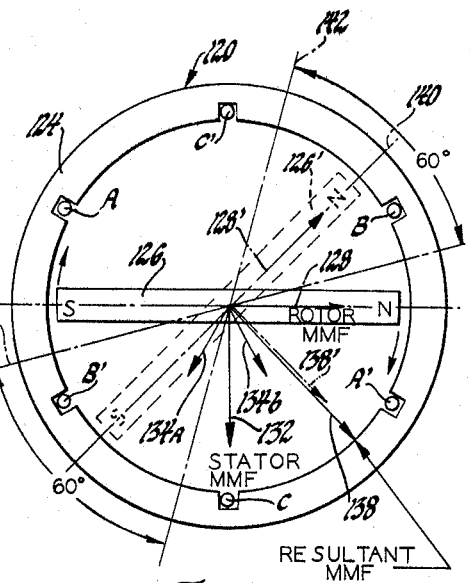
FIGURE 6 is a diagrammatic illustration of the motor magnetic field orientation provided by this invention.

As an aid in understanding the present invention, the following description is made of what is believed to be an explanation of the basic operation of the brushless motor 22. In FIGURE 6, a hypothetical two-pole brushless motor designated 120 is illustrated. Also shown are schematic diagrams of the main magnetic fields which are produced by an ideal motor of a type corresponding to brushless motor 22. The orientation of the magnetic fields is shown relative to a stator part designated 124 and a bi-polar rotor 126.

A three-phase Y connected armature winding is illustrated on stator 124 which includes three single-turn coils, one for each phase. Opposite sides of each single turn coil are indicated by the conductor ends designated A and A', B and B' and C and C'. The coil sides are spaced geometrically sixty mechanical degrees apart to provide a three phase winding distribution for a two pole motor. The coil sides are arranged in the clockwise order illustrated, namely A, C', B, A', C, B'.

The coil sides A, B and C form current "entering" sides and the coil sides A', B' and C' form the current "return" sides. Accordingly, by referring to the corresponding armature phase windings 52A, 52B and 52C in FIGURE 1 it can be observed that entering coil sides A, B and C are connected to motor input terminals corresponding respectively to the input terminals 40, 42 and 44. The return coil sides A', B' and C' are connected to a neutral connection corresponding to connection 56.

As is well known and described in electrical engineering text books of general circulation, for example, volume I of Chester L. Dawes' book "Electrical Engineering," 4th edition, McGraw-Hill Book Company, Inc., 1952, page 479 et seq., the static planes of magnetic fields developed by a field magnetomotive force (MMF) and an armature magnetomotive force (MMF) are oriented so that the magnetic planes are ninety degrees apart. This orientation produces a maximum torque on the motor rotor. In FIGURE 6, the armature phase windings must produce an armature MMF relative to the stator 124 which is oriented at ninety degrees from the plane of the rotor-field MMF.

The initial orientation of the individual motor magnetic fields of FIGURE 6 is considered for a static condition with the rotor 126 having the designated North (N) and South (S) magnetic poles that are developed by an MMF in the direction of arrow 128. The axis of a plane 130 represents a reference position of the rotor which also coincides with the plane of the rotor MMF. In the static magnetic condition, the plane of the stator-armature MMF, indicated by directional arrow 132, is produced so that the armature magnetic poles are ninety degrees clockwise from the field MMF to produce maximum clockwise torque of rotor 126.

To produce a plane of armature MMF in the direction of arrow 132, the armature windings are energized in accordance with the first sixty electrical degree period as illustrated in the graph of FIGURE 2. The voltage at the input of coil side A is positive with respect to the input at coil side B so that current flows into the entering side A through coil side A' and then through return coil side B' to the entering coil side B. Armature current flowing in the direction just described develops individual magnetomotive forces in the two coils which are in the planes shown respectively by directional arrows 134A and 134B. The combined MMF of the two coils produces the resultant armature MMF directed in the plane of arrow 132.

The orientation of the stator-armature MMF and the rotor MMF forms a "neutral" magnetic plane that coincides with the stator-armature MMF which also coincides with the plane including coil sides C and C' (which are not energized). In a commutated D.C. motor the theoretical brush axis or location of commutation of the armature current is provided along this neutral plane.

The orientation of the rotor MMF and stator MMF have been considered separately hereinabove but in practice the two fields produce a resultant motor MMF in a plane indicated by directional arrow 138. Accordingly, the neutral plane of a D.C. motor is shifted backward due to this effect which is referred to as armature reaction. In a commutator motor this effect requires the brush axis to be shifted backward which also corresponds to energizing the armature windings sooner with respect to the plane of the field MMF. The same effect is produced in a brushless motor by energizing the stator-armature windings sooner, for example, when the rotor is aligned along the plane 140 as indicated by the rotor position 126' shown in dashed lines. The rotor MMF 128' produced along the plane 140 is slightly more than ninety degrees counterclockwise from the plane 138 of the resultant motor MMF. The corresponding resultant motor MMF 138' is decreased because of the demagnetizing effect of the armature MMF upon the field MMF. The plane 140 is slightly greater than ninety degrees, as noted in the above-mentioned text, to compensate for self-induced magnetic fields which are developed in the armature coils when current is switched from one coil to another further distorting the motor fields. Accordingly, for the condition just described, the rotor position along plane 140 corresponds to the commutation angle of the brushless motor at which instant input current is applied to the armature windings to produce maximum torque on the rotor.

Referring to the lower graph of FIGURE 2, it is observed that the current flows in a given direction through two armature phase windings for sixty electrical degrees. Since, as noted further hereinbelow, the electrical degrees and mechanical degrees are equal in a two-pole motor, current must be supplied through coils A and B for thirty mechanical degrees either side of the plane 140. The planes 142 and 144 represent the planes which are sixty degrees apart. Therefore, the zero electrical degree line shown in the graphs of FIGURE 2 corresponds to the commutation angle or instant at which current is applied to the armature winding when the rotor is aligned with the plane 142. The armature current has a conduction period that continues until the rotor has reached the plane 144 which is sixty mechanical or sixty electrical degrees later.

As noted above, since the ideal motor of FIGURE 3 is a two-pole motor, the armature windings are energized for sixty mechanical degrees of rotation of the rotor during a corresponding sixty electrical degree conduction period. Generally, the angle of the applied electrical signal is related to the geometrical or mechanical angle of the rotor position by dividing the mechanical angle in degrees by one-half the number of motor poles ($P/2$). In an eight pole machine, for example, there are four groups of the three phase coil windings illustrated in FIGURE 6 and therefore each of the three phase winding sides is spaced every 15 mechanical degrees. The armature windings are energized in the same three phase sequence so that an angle of sixty electrical degrees corresponds to an angle of 15 mechanical degrees.

Referring further to the operation of the ideal motor illustrated in FIGURE 6, under substantially constant load and speed conditions the relationship between the stator and rotor MMF's remain the same throughout the cycle of input voltage relative to rotor position. Change of motor speed, however, causes a change in armature reaction and self-induced magnetic fields and the plane of resultant MMF is reoriented relative to the rotor MMF because of further demagnetizing and cross-magnetizing effects on the motor magnetic field. The fields become distorted so that they are not in the most effective torque producing relationship otherwise requiring increased input voltage for a given motor output. To compensate for these effects that increase with motor speed, the commutation angle or instant at which the armature windings are energized is moved or advanced to the instant where the rotor 126 is in a position more counterclockwise from plane 142. Also to maintain a conduction period of sixty electrical degrees, the plane 144 is moved counterclockwise by the same angle as is plane 142. The commutation control arrangement of this invention controls the input voltage to the armature windings such that the input voltages are produced sooner with respect to the rotor position or advances the commutation angle with increased speed. Therefore, in the present invention the zero electrical degree line in the graph of FIGURE 2 will be shifted further counterclockwise from the plane 142 of FIGURE 6. This change of relationship between the armature input voltage and rotor position at increasing motor speeds is referred to hereinafter as commutation angle advance.

Figure 3:
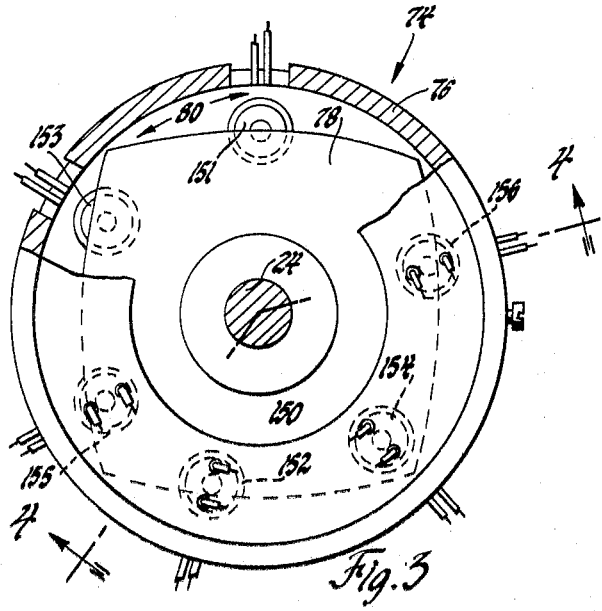
FIGURE 3 is a sectional end view of the rotor position sensor shown in FIGURE 1 illustrating a shaft mounted disk and six pickup sensors made in accordance with this invention.
Figure 4:
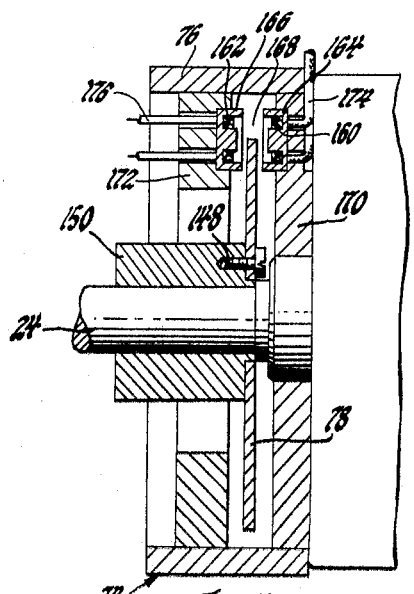
FIGURE 4 is a sectional view looking in the direction of the arrows 4—4 of FIGURE 3.

In FIGURES 3 and 4, the rotor position sensor 74 is illustrated in detail within the housing 76. The disk 78 is made of a conductive material such as aluminum, and is fastened by one or more screws 148 to a hub 150 force fitted to shaft 24. The disk 78 is mounted to shaft 24 so that it rotates adjacent to the pickup sensor arrangement 80 described below.

The pickup sensor arrangement 80 includes six pickup sensors designated 151, 152, 153, 154, 155 and 156. The pickup sensors 151 through 156 include a radio frequency transformer means described in the Patent 3,297,926 noted hereinabove. Each pickup sensor includes a primary transformer winding 160, illustrated in the cross-sectional view of FIGURE 4 and a secondary transformer winding 162. The primary winding 160 is a single coil wound on a ferrite cup core designated 164. The secondary winding 162 includes a center tapped coil winding that is wound on another substantially identical cup core designated 166. The cup cores 164 and 166 are made of a ferrite magnetic material having a cup-shape with an extending center portion that receives coil conductors forming one of the transformer windings. The open ends of the cup cores 164 and 166 are arranged in facing and spaced apart relationship so that the magnetic coupling between the transformer windings includes an air gap space 168.

A pair of plate members 170 and 172 support the cup cores of pickup sensor arrangement 80. Each of the primary winding cup cores 164 are mounted in cylindrical recesses of the plate member 170 and correspondingly the secondary winding cup cores 166 are mounted in cylindrical recesses provided in the plate member 172. The plate members 170 and 172 include a center opening to permit the motor shaft 24 to extend through each plate member. Also, both plate members 170 and 172 are secured to the housing 76 on either side of the disk 78. Accordingly, the air gap space between the cup cores 164 and 166 of each pickup sensor includes a space within which disk 78 rotates. The disk variably shields the two transformer windings to decrease inductive coupling across the air gap.

Conductors designated 174 are connected to the terminal conductors of each primary winding 160 and extend through the plate member 170. Similarly, conductors 176 are connected to the terminal conductors of secondary winding 162 and extend through to the opposite side of the plate member 172. The conductors 174 and 176 are connected to a rotor position detector circuit generally designated 178 in FIGURE 5.

Figure 5:
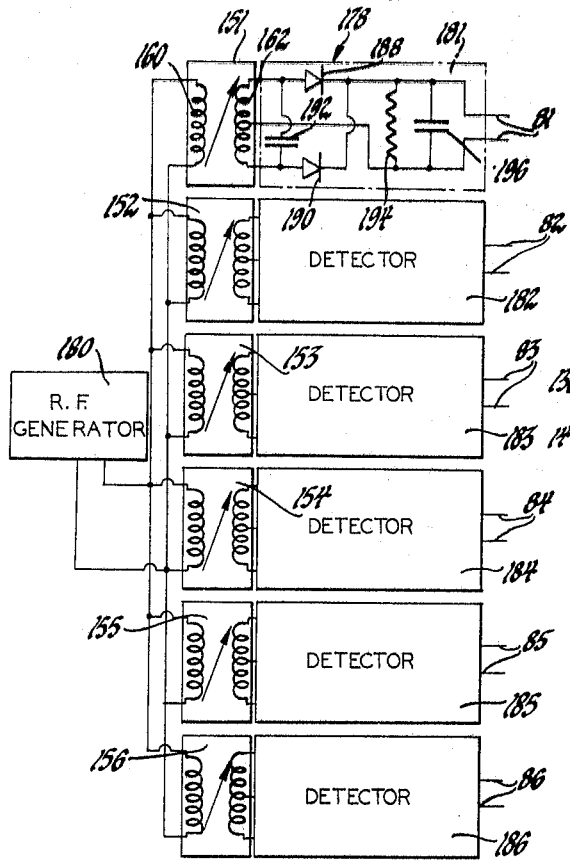
FIGURE 5 is a schematic diagram of a rotor position sensor circuit arrangement connected to the pickup sensors of FIGURE 3.

The rotor position detector circuit 178, which is illustrated in the schematic circuit diagram of FIGURE 5, includes a radio frequency generator 180 of the fixed frequency oscillator type which is connected to the primary winding 160 of each of the respective pickup sensors 151–156. The frequency of the R.F. generator output signals is in the order of 170 to 200 kilocycles per second. The secondary winding 162 of each of the pickup sensors 151–156 is connected to a full-wave diode detector circuit respectively designated 181 through 186.

The detector circuit 181 is illustrated in detail and the remaining detector circuits 182 through 186 are identical to circuit 181. The center tap secondary winding 162 is connected with the outside winding terminals being separately connected to the anodes of rectifier diodes 188 and 190. A capacitor 192 is connected across the outside terminals of winding 162 and both the anodes of diodes 188 and 190. The capacitor 192 includes a capacitance value that provides a tuned resonant circuit when connected in parallel with the inductance of the coil winding 162 which has a resonant frequency equal to the frequency of R.F. generator 180. The cathode electrodes of each of the diodes 188 and 190 are connected together and to one end of a parallel connection including resistor 194 and capacitor 196. The center tap terminal of winding 162 is connected to the other end of the parallel connected resistor 194 and capacitor 196. The resistor 194 and the capacitor 196 form a filter circuit so that the radio frequency signal component is removed from the voltage signal developed in secondary winding 162. The output of the diode detector circuit 181 is provided across the parallel connected resistor 194 and capacitor 196 and this output is connected to the conductors designated 81. In a similar manner conductors 82 through 86 are respectively connected to the outputs of the detector circuits 182 through 186. The conductors 81 through 86 are also connected to the inputs of the trigger control circuit 90 as noted hereinabove.

Rotation of the disk 78 produces an amplitude modulated voltage in each diode detector circuit. Rotation of the disk 78 varies the transformer coupling across the air gap space between the cup cores 164 and 166 of each pickup sensor. The disk shape determines the amount that the transformer windings are shielded from each other so that when the conductive material of disk 78 substantially covers the air gap there is minimum inductive coupling. As the disk rotates, the air gap becomes less shielded such that the inductive coupling across the air gap increases to produce increased voltage in the secondary winding 162. Variation of the inductive coupling produces an amplitude variation in the secondary winding voltage in accordance with the shielding of the air gap provided by disk 78.

The detected voltages produced on the conductors 81 through 86 by the respective diode detector circuits 181 through 186 by rotation of the disk 78 produces a triangular shaped voltage signal every sixty electrical degrees as described further below.

In FIGURE 7 the location and angular spacing of the individual pickup sensors 151 through 156 are illustrated as they are mounted in the rotor position sensor 74 for an eight pole brushless motor 22. The rotor disk 78 for the eight pole motor is illustrated in the perspective view of FIGURE 8 removed from the motor shaft 24. Because the shape or contour of disk 78 and the location of the pickup sensors 151 through 156 are interrelated in controlling the voltage input to the motor armature windings, the disk and pickup sensors are described with reference to the two graphs of voltage wave forms illustrated in FIGURE 9.

The upper graph of FIGURE 9 illustrates a time graph of triangular voltage signals developed by the pickup sensors 151 through 156 and produced at the output of the sensor detector circuits 181 through 186 shown and described with reference to FIGURE 5. The lower graph of FIGURE 9 illustrates a time graph of the corresponding voltages developed across the respective motor armature phase windings 52A, 52B and 52C in the same sequence as illustrated in FIGURE 2. The time sequence of the voltages are indicated with respect to both the top scale of FIGURE 9 which indicates the angle of disk position in mechanical degrees and the lower scale which indicates the electrical phase angle in electrical degrees. In an eight-pole motor, rotation of the rotor through fifteen mechanical degrees corresponds to an angle of sixty electrical degrees of the motor frequency. Accordingly, when the rotor of the eight-pole machine rotates one complete revolution of 360 mechanical degrees, there will be four complete voltage cycles equal to 1440 electrical degrees as indicated.

Figure 8:
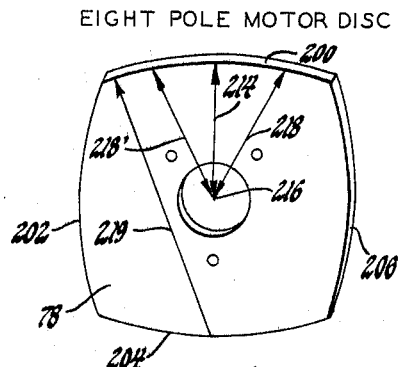
FIGURE 8 is a perspective view of the rotor disk of FIGURE 7.

The eight-pole motor disk 78 illustrated in FIGURE 8 is provided with four identical arcuate sides 200, 202, 204 and 206. Each disk side modulates the inductive coupling across the air gap of a given pickup sensor and in one complete revolution each sensor produces four voltage signals in a manner hereinafter described.

The general geometrical orientation of the pickup sensors illustrated in FIGURE 7 is provided by first mounting each of the pickup sensors 151, 152, 153, 154, 155 and 156 on the plates 170, 172, described hereinabove so that the centers of the sensor lie on a circle 208. The diameter of the sensor cup cores 164 and 166 also described above, determines the air gap space which provides the inductive coupling between the spaced-apart primary and secondary windings of the respective cup cores. A circle 210 referred to as a circumscribing circle touches or forms a locus of the outer radial points of each air gap space. An inscribing circle designated 212 defines the locus of inner radial points of each air gap space. accordingly, variation in the amount of disk material extending between the inscribing circle 212 and circumscribing circle 210 of each sensor air gap varies the attenuation of the output voltage signal of each pickup sensor.

Observing the response of a single sensor 151 with respect to the disk 78, a useful maximum sensor voltage output is developed when the center of the arcuate side of each disk extends to approximately the center of a pair of sensor cup cores. This is equal to the radius of circle 208 which is indicated by line 214 on disk 178 illustrated in FIGURE 8. The length of line 214 then determines the minimum distance from the center 216 of the disk to each of respective disk sides 200, 202, 204 and 206 and also determines the center of each disk side. The radial distance between the disk center 216 and each disk side increases toward the peripheral ends of the disk sides which terminate at corners intersecting with an adjacent disk side. Between the ends of each disk side, the radial lengths to the side which are indicated at 218 and 218′ are such that when either is aligned with the center of a sensor air gap space the air gap is effectively shielded. Clockwise rotation of the area of the disk material included between radial lines 218 and 218′ decreases the air gap shielding to a minimum at line 214 and then increases to the maximum shielded condition.

In order that the signal produced by the pickup sensor be linear and produce a triangular-shaped voltage, the arcuate edge of each disk side is symmetrical between its center location and the side locations at the ends of lines 218 and 218′. In the disk illustrated in FIGURE 8, the arcuate disk sides are formed along a 90 degree circular arc having a radius which is indicated by line 219 that is approximately twice the distance of the line 214. This permits the sensor to be unshielded during orientation of a center 60 degree arc distance of the disk side between lines 218 and 218′. If the radius line 219 is varied, correspondingly, the duration or period of the sensor voltage signal which is developed is varied. In practice each triangular voltage should extend for a minimum phase angle of approximately 180 electrical degrees although in FIGURE 9 such sensor voltage is developed with a duration of 240 electrical degrees.

In FIGURE 7, disk 78 is positioned with its side 200 centered in the air gap space of sensor 151. This corresponds to the fifteen degree disk position indicated in the top row of wave forms of FIGURE 9. Accordingly, the output signal of sensor 151 is maximum as indicated at 220. A second disk position is indicated by the disk 78' which is rotated fifteen degrees clockwise from the position of disk 78. This corresponds to the thirty degree disk position and accordingly the sensor is increasingly shielded and the sensor output is lowered to the value indicated by numeral 222. A third disk position indicated by disk 78" is rotated an additional fifteen degrees from the position of disk 78' corresponding to the 45 degree disk position. The voltage output of sensor 151 is minimum as indicated at numeral 224 and the air gap space is substantially shielded. This position corresponds to the disk of FIGURE 8 having the radial line 218' aligned within the air gap space of sensor 151. The change of rotor position is thereby indicated by the substantially linear voltage produced between points 220 and 224 in response to clockwise rotation of the disk 78. If the disk 78 is rotated counterclockwise an identical decreasing voltage signal would be produced. Accordingly, a triangular-shaped voltage is produced when the disk side with line 218 is first aligned in the air gap space of sensorf 151 and then begins to rotate clockwise so that the voltage coupled across the sensor air gap begins to increase to form the leading edge of the output voltage signal. When the maximum voltage is reached and the disk continues to rotate toward the side of the disk between lines 214 and 218', the sensor output voltage begins decreasing to form the trailing voltage edge until it reaches a minimum value.

In practice the triangular-shaped voltage varies from a true geometrical triangle since the center of the triangular voltage is slightly rounded as indicated by the rounded portion designated 226 in FIGURE 9. For purposes of this invention it is primarily required that the leading and trailing sides of the triangular voltage be substantially linear and symmetrical for reasons that will become apparent hereinafter.

The sensor signals are operative, by means of the trigger control circuit 90 described in detail hereinbelow, to produce the voltage across the armature phase windings 52A, 52B and 52C as indicated in FIGURE 9. A sensor signal is produced every sixty electrical degrees or 15 mechanical degrees of rotation of the eight pole motor rotor. This is required since the switching sequence described in connection with FIGURE 2 includes switching of the motor armature voltage each sixty electrical degrees.

The location of each sensor 151 through 156 is oriented as indicated in FIGURE 7 relative to the other sensors and the sides of disk 78 to produce the triangular sensor voltages illustrated in FIGURE 9. In one empirical method to determine the exact locations of the sensors on circle 208, a pattern of the disk 78 is placed over a circle corresponding to circle 208 with the centers of the disk and circle aligned. An outline of the pickup sensor 151 is placed at the top of circle 208 as indicated in FIGURE 7 and then the sequence of sensor output voltages in the top graph of FIGURE 9 is noted.

It is seen that a sensor voltage is a maximum at every 15 degree position of the disk corresponding to a minimum shielded state. Also when the output of one sensor is maximum, a second sensor is midway between its maximum output states or 180 electrical degrees out of phase with the other sensor output. Accordingly, the first sensor is in the center of its unshielded state while the second is in the center of its shielded state. The following pairs of sensors have opposite phases, 151 and 154, 152 and 155, 153 and 156. When a given pair of sensors are in the condition noted above, each sensor of another pair of sensors will have the same shielded state proportionally less than the maximum unshielded state. For example, at the fifteen degree disk position, sensors 152 and 156 produce one-half the maximum voltage with output of 152 increasing and the output of sensor 156 decreasing. At the same instant the output of sensors 153 and 155 are minimum with the first at the beginning of a voltage signal and the second at the end of a voltage signal.

The relationship is more apparent if the disk is arranged so that each sensor voltage extends for 360 electrical degrees or 90 degrees of disk rotation so that, for example, when sensor 151 is in its maximum unshielded state, sensor 154 is in its maximum shielded state, one-third of the air gaps of sensors 152 and 156 are shielded and two-thirds of the air gaps of sensors 153 and 155 are shielded relative to the maximum unshielded state.

With the above relationships of the sensor signals in mind, the pattern of disk 78 is aligned with the center of side 200 aligned with a pattern of sensor 151. This corresponds to the fifteen degree disk location, as noted above. The sensor 154 is located 135 degrees clockwise from sensor 151 since in this location it is in the center of its shielded state between disk sides 204 and 206. The disk is then rotated 15 mechanical degrees as indicated by the disk 78' which corresponds to the thirty degree disk position. At this position sensor 152 is in a maximum unshielded state, so it is positioned at the center of disk 204 which is 60 degrees clockwise from the sensor 154. The pickup sensor 155 is located 45 degrees clockwise from the pickup sensor 152 since in this location it is in a maximum shielded location relative to the disk 78'. The disk 78' is rotated through an additional fifteen degrees as indicated by the disk designated 78" which corresponds to the 30 degree disk position. In this position the sensor 153 is in a maximum unshielded location and therefore is located clockwise 60 mechanical degrees from sensor 155 so that the center of the disk side 202 is aligned with its center adjacent to the center of pickup sensor 153. The pickup sensor 156 is in the center of a maximum shielded condition and therefore is placed at 75 degrees clockwise from pickup sensor 151.

With the pickup sensors in the above-described locations, the sequence of output signals is produced as illustrated in the top graph of FIGURE 9. It was also determined empirically that there are locations of the six position sensors other than the preferred locations noted above that will produce signals in the same sequence as illustrated in the upper graph of FIGURE 9. Since the signals occur in the same sequence, the numbering can be altered, for example, sensor 152 can be designated 151 and sensor 153 can be designated 152, sensor 154 can be designated 153, etc. Also, this arrangement is not limited to an eight-pole motor as will be explained further hereinbelow in reference to FIGURES 10 through 12 illustrating the relationship of a six-pole motor disk and the pickup sensors for a six-pole motor.

Referring now to FIGURE 13, one preferred embodiment of the trigger circuit 90, generally shown in FIGURE 1, is illustrated in a schematic circuit diagram. The trigger control circuit channel 91 is shown in detail at the top of the drawing and the remaining channels 92 through 96 are identical and are indicated as block diagrams. Each channel receives pickup sensor and speed reference signals to produce gating pulses. The reference voltage source 98 applies D.C. voltages through conductors 106 and 108 to the trigger control circuit 90 which have positive voltage levels relative to ground and decrease when the motor speed rises. In the circuit arrangement 104 of the voltage source 98, speed pulses are applied to a one-shot multivibrator connected to an integrating circuit so that as the rate of pulses increases the D.C. voltage output decreases.

The details of the circuit channel 91 will now be described in detail, and it is to be understood that the operation of the channels 92 through 96 operate in the same manner and that these six circuit channels correspond to channels 91–96 shown generally in FIGURE 1. A pickup sensor triangular voltage signal is received from the detector circuit 181 of rotor position sensor detector circuit 178 (shown in FIGURE 5) via the input provided on conductor 81. The voltage signal is applied to an amplifier circuit designated 226. The positive going voltage signal is applied through base resistor 228 and to the base input circuit of an NPN transistor 230. A resistor 232 is connected between the collector of transistor 230 and a power supply conductor 234 connected with a suitable source of direct current voltage. The potential of supply conductor 234 is a positive twenty volts relative to the negative and grounded conductor 236. The emitter of transistor 230 is connected through a resistor 240 to conductor 236. A PNP transistor 242 is connected at its base electrode to the collector electrode of transistor 230. The emitter of transistor 242 is connected through resistance 244 to the positive supply conductor 234 and its collector electrode is connected through resistor 246 to the negative supply conductor 236. The output of amplifier circuit 226 is provided at the collector of transistor 242 by two junctions designated 248 and 250 respectively.

Each of the trigger control circuit channels includes a first and a second bistable comparator circuit referred to hereinafter respectively as a turn-on bistable circuit 252 and a turn-off bistable circuit 254 for reasons that will become apparent later in this description. A first output of amplifier 226 is applied from junction 248 to the turn-on bistable 252. A second amplifier output at junction 250 is supplied through conductor 256 to the turn-off bistable of another trigger circuit channel, namely, channel 95. Accordingly, a corresponding amplifier output conductor designated 258 of channel 93 is connected to the turn-off bistable circuit 254 of channel 91. The turn-on and turn-off bistable circuits 252 and 254 of each channel also receive a motor speed reference voltage supplied on conductors 106 and 108. The signal on conductors 106 and 108 is a D.C. voltage which controls the trigger level of the bistable circuits as described hereinafter.

The amplifier output at junction 248 is connected to the base of NPN transistor 258 via a series base resistor 260. The collector electrode of transistor 258 is connected through resistors 262 and 264 to the supply conductor 234. The emitter electrode of transistor 258 is connected to junction 266 connected to both one end of resistor 268 and to the conductor 106 connected to motor speed voltage source 98 through a rectifier diode 272. The other end of resistance 268 is connected to the negative supply conductor 236. The transistor 258 becomes conductive when its base voltage is more positive than the emitter. The voltage at the emitter electrode is determined by the value of the resistance 268 and the potential of the voltage of conductor 106. When the potential at the base electrode of transistor 258 is more positive with respect to its emitter, for example from 0.3 to 0.5 volt, the collector-emitter circuit of transistor 258 becomes conductive. Current then flows through the resistors 262 and 264 to lower the voltage at junction 274 which is connected to the base input of a PNP transistor 276. The emitter of transistor 276 is connected through a temperature compensating diode 278 to the supply conductor 234. The collector electrode of transistor 276 is connected through a resistor 280 to the negative supply conductor 236. The collector electrode of transistor 276 is coupled to the base of transistor 258 by a feedback resistor 282.

The turn-off bistable circuit 254 is substantially identical to the turn-on bistable circuit 252. An NPN transistor 284 and PNP transistor 286 respectively correspond to the transistors 258 and 276 of the turn-on bistable 252. The conductor 258 from channel 93 is connected in series with resistor 288 to the base of transistor 284. Resistors 290 and 292 are connected between the collector of transistor 284 and supply conductor 234. The base electrode of transistor 286 is connected to the junction 294 of resistors 290 and 292. The emitter electrode of transistor 286 is connected through a temperature compensating diode 296 to supply conductor 234. The collector electrode of transistor 286 is connected through a feedback resistor 298 to the base of transistor 284 and also through resistor 302 to the negative supply conductor 236. The emitter of transistor 284 is connected to junction 304 which is connected to one end of resistor 306 and to the conductor 108 including a series connected rectifier diode 305. The other end of resistor 306 is connected to negative supply conductor 236.

Referring further to the details of trigger control circuit 91, the output of turn-on bistable circuit 252 is provided on conductor 310 which is connected to the collector electrode of transistor 276. The output of turn-off bistable circuit 254 is provided on conductor 312 which is connected to the collector electrode of transistor 286. The conductors 310 and 312 are respectively connected through series connected rectifier diodes 316 and 318 which in turn are respectively connected to an output bistable circuit designated 314.

The output bistable circuit 314 includes two NPN transistors 320 and 322 connected in a bistable multivibrator circuit arrangement. The circuit 314 provides the operation of a flip-flop circuit by producing a pulse in response to triggering voltage spikes applied to a first or turn-on input 324 at the base of transistor 320 and a second or turn-off input 326 at the base of transistor 322. A first differentiator circuit 328 and a second differentiator circuit 330 are respectively connected between the turn-on bistable 252 and the first input 324 and between the turn-off bistable circuit 254 and the second input 326. The differentiator circuits develop voltage spikes from voltage pulses produced by the turn-on and turn-off bistable circuits. The differentiator circuit 328 is formed by a resistor 332 and a capacitor 334 connected between diode 316 and one end of the resistor 332. The junction of capacitor 334 and resistor 332 is connected to the input 324 of transistor 320. The other end of resistor 322 is connected to the negative supply conductor 236. The second differentiator circuit 330 includes a resistor 336 and a capacitor 338 which is connected between the diode 318 and one end of resistor 336 which is also connected to the input 326 of transistor 322. The other end of resistor 336 is connected to the supply conductor 236.

The transistors 320 and 322 are interconnected by a pair of cross-coupling networks including parallel connected capacitor 340 and resistor 342 connected between the collector of transistor 320 and the base of transistor 322. The other cross-coupling network includes parallel connected capacitor 344 and resistor 346 connected between the collector of transistor 322 and the base of transistor 320. The collector electrodes of transistors 320 and 322 are respectively connected through resistors 350 and 352 to the positive supply conductor 234.

The emitter electrodes of the respective transistors 320 and 322 are connected together to one end of both a capacitor 354 and resistor 356 with both elements having an opposite end connected to supply conductor 236. The collector of transistor 320 is connected through a resistor 358 to the junction of diode 318 and capacitor 338 and the collector of transistor 322 is connected through a resistor 360 to the junction between diode 316 and capacitor 334. The resistors 358 and 360 prevent charge accumulation on the respective capacitors 338 and 334 which otherwise is blocked by diodes 316 and 318.

The output of bistable circuit 314 is produced at the collector of transistor 320 which is connected to parallel resistor 361 and capacitor 362 to the base of PNP transistor 364 which forms a pulse amplifier circuit in a gating pulse circuit 366. The base electrode of transistor 364 is also connected to resistor 367 which is further connected to the supply conductor 234. The emitter electrode of transistor 364 is directly connected to supply conductor 236 and the collector electrode is connected in series to the primary winding 368 of a pulse transformer 370 having three secondary windings 372, 374 and 376. The primary winding 368 is connected in parallel with a resistor 378 and this parallel combination is connected in series with a parallel combination including capacitor 380 and resistor 381 which is also connected to negative supply conductor 236. The conductors 111A, 111B and 111C, which correspond to conductors designated 111 in FIGURE 1, are respectively connected to windings 372, 374 and 376. The transformer 370 provides alternate polarity pulses to gate trigger circuits (not shown) connected to each secondary winding. Each gate trigger circuit includes a gate controlled switch having the anode and cathode connected between a D.C. source and the gate electrode of each controlled rectifier of switching group 61. The gate controlled switch is gated *on* and *off* by the opposite polarity pulses formed in each secondary winding to form a gating pulse having the same pulse width as the pulse produced by bistable circuit 314.

Each of the trigger control circuit channels 92–96 of trigger control circuit 90 are interconnected as explained in connection with the description of channel 91. This interconnection applies a pickup sensor voltage to the turn-on bistable circuit of one channel and the same pickup sensor voltage to the turn-off bistable circuit of another channel. Accordingly, in addition to the pickup sensor output on conductor 81 being connected from the amplifier 226 to turn-on bistable circuit 252 and to the turn-off bistable circuit of channel 95 and also the output of the input amplifier of channel 93 being connected to the turn-off bistable circuit 254; conductors 382, 384, 386 and 388 respectively connected to the turn-on and turn-off bistable channels 95, 92, 94 and 96 to the respective turn-off bistable circuits of channels 93, 96, 92 and 94. Concurrently, the output of each channel input amplifier is connected to the turn-on bistable of the same channel. The remaining input and output connections of channels 92–96 include the conductors 82, 83, 84, 85 and 86 from the detector circuits 182, 183, 184, 185 and 186, shown in FIGURE 5, respectively connected to the input amplifiers of channels 92, 93, 94, 95 and 96. The conductors 106 and 108 are respectively connected to the turn-on and turn-off bistable circuits of each channel and the output conductors 112, 113, 114, 115 and 116 are respectively connected to the gating circuits of channels 92, 93, 94, 95 and 96. Each of the output conductors includes the three gating pulse circuit outputs corresponding to that provided by conductors 111A, 111B and 111C of channel 91.

The operation of the trigger control circuit channel 91, and correspondingly the channels 92 through 96, is illustrated in the time graph of voltage wave forms in FIGURE 14. The upper wave shape illustrates the signal developed from the output of pickup sensor 151 and applied to conductor 81 at the input of channel 91. When the positive going pickup sensor voltage is applied through resistor 228, the base-emitter circuit of NPN transistor 230 is forward biased so that conduction through the collector-emitter circuit increases in response to the increased amplitude of voltage applied across the base-emitter circuit. Before transistor 230 begins to conduct, the transistor 242 is biased nonconductive by the positive potential of the conductor 234. As the transistor 230 begins to conduct, the potential at the base of transistor 242 becomes less positive or of a more negative potential proportional to the increasing conduction of transistor 230. The negative going voltage occurring at the base of transistor 242 causes the base-emitter circuit of transistor 242 to become forward biased and the collector-emitter to become more conductive. Accordingly, the voltage occurring at the junctions 248 and 250 increases as transistor 242 becomes more conductive. In the foregoing manner the output of transistor 242 produces an amplified triangular voltage corresponding to the voltage developed by the pickup sensor 151.

The amplifier output at junction 248 applies the amplified sensor output voltage to the turn-on bistable circuit 252. The base of transistor 258 is biased more positive relative to the emitter by the positive going leading edge of the amplified triangular voltage signal. The voltage potential occurring at junction 266, which is connected to the emitter of transistor 258, determines the triggering level of the turn-on bistable 252. This trigger level is established in response to the motor speed responsive voltage developed on conductor 106. The triggering level of the turn-on bistable is indicated by numeral 266′ in FIGURE 14. Accordingly, when the base potential of transistor 258 is more positive than the potential at junction 266 the transistor 258 begins to conduct at the instant indicated by reference line 392. The voltage at the base electrode of transistor 276 goes less positive or more negative when transistor 258 is conductive so that it also becomes conductive as transistor 258 begins to conduct. The resistor 282 forms a feed-back path coupling the collector of transistor 276 to the base of transistor 258 so that as transistor 276 begins to conduct, increased positive potential is produced at the base of transistor 258. A regenerative switching action occurs that switches the bistable circuit 252 from nonconductive to conductive states rapidly.

Accordingly, a positive going pulse is developed at the output conductor 310 when transistor 276 is switched to a conductive state during the period in which the potential of the pickup sensor signal produced by sensor 151 exceeds the trigger reference level established at the junction 266. The turn-on bistable pulse is indicated in the third graph of wave forms in FIGURE 14.

In a similar manner the output of turn-off bistable 254 provides a pulse during the time when the signal from pickup sensor 153 is more positive than the trigger reference level indicated at 304′ in the second graph of wave forms in FIGURE 14 which occurs at junction 304. The signal of pickup sensor 153 is applied to conductor 258 which is developed at the output of the input amplifier of channel 93. The trigger reference level 304′ is determined by the motor speed voltage occurring on conductor 108. A turn-off bistable pulse is thereby produced on conductor 312 at the instant indicated by reference line 394 and this pulse is illustrated in the fourth graph of voltage wave forms in FIGURE 14. The substantially linear rising and falling sides of each sensor signal may be considered as ramp signals in which the rising or leading sides trigger the turn-on and turn-off bistable circuits conductive in accordance with the trigger level. Therefore, the bistable circuits form a voltage comparison feature responsive to sensor voltage amplitude which varies with rotor position.

When the turn-on bistable 252 is triggered the output pulse produced goes positive to develop a positive going pulse in the form of a voltage spike in the first differentiator circuit 328. This voltage spike pulse is developed at the instant 392 as illustrated in the fifth graph of wave forms in FIGURE 14. The voltage spike is applied to the turn-on input 324 of the output bistable circuit 314. The end of the output pulse of the turn-on bistable 252 drops from a positive potential to a lower potential thereby developing a negative pulse in the first differentiator circuit. A negative pulse input produces no effect in the output bistable circuit 314 and therefore only positive polarity voltage spikes are required to trigger this circuit. The second differentiator circuit 330 develops a positive going pulse at the leading edge of the pulse provided at the output of the turn-off bistable 254 which is coincident at the instant 394 illustrated in the sixth graph of wave forms in FIGURE 14. The positive going pulse of the first differentiator circuit is connected to the junction 326 at the turn-off input of the output bistable circuit. The positive going voltage spike of the first differentiator circuit forward biases the base-emitter circuit of NPN transistor 320, which is normally nonconducting, so that the voltage at the collector transistor 320 drops. The conductive state of the transistor 320 lowers the resistance of the emitter-collector circuit of the transistor so that the collector potential is close to the potential of negative supply conductor 236. The drop of the potential at the collector of transistor 320 is coupled through the coupling network including capacitor 340 and resistor 342 to the base of transistor 322 to bias transistor 322 from a normally conducting state to a nonconducting state through its collector-emitter circuit. Accordingly, a pulse is produced at the collector of transistor 320 at the instant 392 as illustrated in the bottom graph of wave forms in FIGURE 14.

The positive voltage spike pulse from the second differentiator circuit 330 is applied to the base of transistor 322 to thereby forward bias the base-emitter circuit of the transistor so that it is switched to a conductive state in its collector-emitter circuit. The potential at the collector of transistor 322 drops to a voltage near the potential of negative supply conductor 236. This drop of potential is coupled to the base of transistor 220 to switch it from the conducting state to its normally nonconductive state.

Since the leading edge of the pulse produced by the turn-on bistable circuit 252 initiates the output bistable pulse, this bistable is referred to as the turn-on bistable. Similarly, the leading edge of the pulse produced by the turn-off bistable circuit 254 terminates the pulse produced by the output bistable circuit 314 and therefore is referred to as a turn-off bistable circuit. These bistable pulses are always produced 120 electrical degrees apart which is the interval between the triggering times indicated between lines 392 and 394. This is provided by the rising ramp voltage of the sensor 153 occurring 120 electrical degrees following the voltage produced by sensor 151, as illustrated in FIGURE 9. Therefore, the instant 392 in FIGURE 14 corresponds to the zero electrical degree time of FIGURE 9.

The gating circuit 366 produces a positive going gating pulse in the primary of the transformer 370 in response to the output pulse of output bistable 314. The PNP transistor 364 is biased conductive when the output bistable transistor 320 is biased conductive during the period of the output bistable pulse. The three secondary windings 372, 374 and 376 respectively produce three pulse signals that develop triggering pulses at the gate electrodes of the controlled rectifiers in the group of switching devices 61 shown in FIGURE 1. The pulse produced by output bistable 314 provides the *on* conduction period indicated for the controlled rectifiers 61A, 61B and 61C in the upper graph of FIGURE 2.

The operation of the trigger control circuit channel 91 described above continues at a given motor speed. When the motor speed increases, the output of the motor speed voltage source 98 changes the potential supplied to the conductors 106 and 108 by producing proportionally lower voltages. There is a change in the trigger level of both the turn-on bistable 252 and turn-off bistable 254 occurring respectively at junctions 266 and 304. This is indicated by the second set of reference lines 392' and 394' in FIGURE 14.

When the trigger level is lowered in the turn-on and turn-off bistable circuits 252 and 254, the output pulse of each of these circuits will have a longer period, as indicated by dashed lines in the graphs of bistable pulses in FIGURE 14, since the pickup sensor voltages exceed the trigger reference levels of the bistables for a longer time. Accordingly, each of the positive going voltage spike pulses produced respectively by the first differentiated circuit and the second differentiated circuit will occur sooner although still displaced 120 electrical degrees apart. This is indicated by the voltage spikes coincident with lines 392' and 394'. The pulse produced at the output bistable circuit 314 is shifted to the left or at an earlier instant than the time illustrated between lines 392 and 394 in FIGURE 14. Thus, the conduction period or angle of the controlled rectifiers is maintained the same although the pulse is advanced because of the lower trigger level provided in the bistable circuits by a change in the motor speed. Since the pickup sensor signals provided by sensors 151 and 153 are responsive to rotor position, the output pulse of the bistable circuit 314 is advanced with respect to rotor position.

The operation of trigger control channel 91 is also provided in the channels 92 through 96 illustrated in FIGURE 13. Each channel receives two pickup sensor output signals such that the second signal is delivered 120 electrical degrees following the first sensor signal.

To explain the operation of the present invention, the FIGURE 1 is referred to as utilizing an eight-pole brushless motor 22, also the associated rotor position sensor 74 operates as described in connection with FIGURES 3 through 5 and FIGURES 7 through 9. The trigger control cricuit 90 operates as explained with reference to FIGURES 13 and 14. The brushless drive motor 22 in one embodiment is capable of providing a nominally rated constant-power output of 20 horsepower throughout a wide speed range of 1,000 to 16,000 r.p.m. At this power rating, the motor will draw a maximum voltage of approximately 330 volts and a maximum current of approximately 140 amperes.

The rotor position sensor 74 is initially adjusted so that voltage is applied to the armature winding 52 at a predetermined rotor position. This is provided by rotating the plates 170 and 172 carrying the pickup sensors 151 through 156 comprising the pickup sensor arrangement 80. Orientation of pickup sensor arrangement 80 is set with respect to an initial commutation angle. First, the predetermined sequence of sensor output signals produced by the rotor position sensor is established as noted hereinabove in response to rotation of disk 78. The terminals of one armature phase winding, for example winding 52A, are connected to the first input of a dual signal oscilloscope device. The output of an associated pickup sensor, for example sensor 151, is connected to a second input of the oscilloscope. One of the conductors 111 is a further convenient output to be applied to the second oscilloscope input. The later input is provided by a gating pulse from trigger control circuit channel 91. The motor field winding 54 is excited from the direct current source 58 and as the shaft 24 is manually rotated a voltage corresponding to the counter EMF motor voltage is induced in the phase winding 52A. A display of a gating pulse developed on one of the conductors 111 is centered on the oscilloscope device with respect to the counter EMF voltage produced in phase winding 52A. This is accomplished by rotating the pickup sensor arrangement 80, as noted above. The fixed orientation of the pickup sensor arrangement 80 is set in one embodiment of this invention so that the gating pulse is approximately 45 electrical degrees in advance of the counter EMF voltage produced in winding 52A. From experience this has been used to establish the initial commutation angle so that a proper orientation is established between the stator-armature field flux and the rotor-field flux. The initial orientation of the pickup sensors provides the relationship with the rotor disk 78 corresponding to the zero degree disk position of FIGURE 9 which also corresponds to a particular orientation of the rotor-field flux.

Briefly reviewing the operation described above, considering the rotor position corresponding to the zero electrical degree angle of FIGURE 2, the controlled rectifiers 62A, 62B and 62C are conducting and the controlled rectifiers 65A, 65B and 65C are being gated *off*. Accordingly, just prior to the zero electrical degree angle, the armautre voltage is a positive polarity at the input of armature phase winding 52C relative to the input to armature phase winding 52B. The voltage of sensor 151 reaches the trigger levels of the turn-on bistable in trigger circuit channel 91 and turn-off bistable in trigger circuit channel 95. Accordingly, a gating pulse is developed by the channel 91 which is applied to controlled rectifiers 61A, 61B and 61C and the gating pulse of channel 95 is removed from controlled rectifiers 65A, 65B and 65C.

The motor terminals 40, 42 and 44 are respectively connected to the conductors 46, 48 and 50 to supply the input motor power to the armature winding 52. Considering a given motor speed, the pickup sensor signals are produced on conductors 81 and 82 in accordance with the sequence illustrated in the upper graphs of FIGURE 9 and produce corresponding armature phase voltages as illustrated in the lower graph of FIGURE 9. The voltage input to armature phase winding 52A is positive with respect to the input to armature phase winding 52B. Armature current paths are accordingly switched from the phase windings 52C and 52B to phase windings 52A and 52B. The same cycle of operation is repeated every 60 electrical degrees followed the above sequence of operation.

Increase of motor speed causes changes in the orientation of the stator-armature magnetic field relative to the rotor-field magnetic field as described hereinabove with reference to FIGURE 6. The motor speed voltage source 98 changes the trigger reference levels of the respective turn-on and turn-off bistable circuits in each trigger control circuit channel in accordance with the increased motor speed. Each of the gating pulses developed by the trigger control circuit 90 occurs at an earlier or advanced electrical phase angle with respect to each sensor voltage output. The armature phase voltages are applied at an advanced position of the rotor and the magnetic field produced by the rotor. Therefore the motor commutation angle is advanced with higher motor speeds.

Modifications of the motor power supply system illustrated in FIGURE 1 are provided in alternative embodiments of the rotor position sensor 74 and trigger control circuit 90 utilizing the inventive concepts of the present invention as described hereinabove. For example, in FIGURES 10 and 11 an arrangement of pickup sensors 80A and disk 78A are illustrated wherein the rotor position sensor 74 of the present invention is provided on a brushless motor 22 having six magnetic poles rather than eight. FIGURE 12 illustrates an upper time graph of six voltage wave forms produced by the respective pickup sensors 151A, 152A, 153A, 154A, 155A and 156A when arranged for control of a six-pole motor. A lower time graph of three voltage wave forms illustrates the respective armature phase winding voltages 52A, 52B and 52C. These voltage wave forms correspond to the graphs illustrated in FIGURE 9 for an eight pole brushless motor. The motor phase voltages are switched in accordance with the same sequence described above with reference to FIGURE 2 referred to as the basic switching sequence although each phase voltage pulse duration extends for 128 electrical degrees rather than for 120 electrical degrees.

FIGURE 15 illustrates an alternative embodiment in the schematic block diagram of a trigger control channel circuit designated 91A that can be used to replace the trigger control circuit channel 91 described with reference to FIGURE 13. Six circuits identical to channel 91A can be used to replace all six channels 91 through 96. The purpose of the modified circuit arrangement illustrated in FIGURE 15 is to require only a single pickup sensor signal to be supplied to each channel of the trigger control circuit 90 rather than utilizing two of such pickup sensor signals as described in connection with the channel 91 referred to in the description of FIGURE 13. Also, a means is included in the circuit to extend the conduction period of the groups of switching devices in switching circuit 38 from 120 to 128 electrical degrees. FIGURE 17 is a modification of the basic arrangement disclosed in FIGURE 15 utilizing a single pickup sensor signal to control the operation of a trigger control circuit channel 91B.

Referring to the FIGURES 10 and 11 illustrating the rotor position sensor for a six pole brushless motor, the pickup sensors designated 151A through 156A are arranged to produce a triangular voltage signal every 60 electrical degrees of the motor input voltage frequency in response to the rotation of the disk 78A. The perspective view of the six pole motor disk is shown in FIGURE 11 wherein the disk 78A includes three sides designated 400, 402 and 404. The disk sides 400 through 404 correspond to the four disk sides 200 through 206 provided on the eight pole motor disk 66 illustrated in FIGURES 7 and 8. The sides of the six pole motor disk 78A extend to corner portions 406, 408 and 410 rather than with an adjacent disk side as in the eight pole motor disk. The corner portions permit the disk 78 to fit within the housing 76.

The locations of the pickup sensors 151A through 156A are determined in the same manner as described in connection with the pickup sensor arrangement for an eight pole motor. In accordance with the relationship discussed above, the disk produces three complete electrical cycles or 1080 electrical degrees for each complete or 360 mechanical degree revolution of the shaft. The graphs of FIGURE 12 are slightly less than one complete motor cycle. As can be seen, twenty mechanical degrees of rotation of the disk 78A corresponds to sixty electrical degrees and therefore a pickup sensor voltage signal is produced each twenty degrees of rotation of the disk 78A. To provide this sequence of signals the sensors are located in a corresponding angular geometric relationship on the pickup sensor supporting plate members 170 and 172 of the rotor position sensor. Accordingly, starting with the pickup sensor 151A and moving counterclockwise, the pickup sensor 155A is mounted at 40 degrees from sensor 151A, the sensor 153A is mounted 40 degrees from 155A, sensor 156A is mounted 60 degrees from pickup sensor 156A, sensor 154A is mounted 40 degrees from sensor 156A. Finally, the pickup sensor 152A is mounted 60 degrees from pickup sensor 154A.

The disk position corresponding to the disk 78A illustrated in FIGURE 10 represents the fifteen mechanical degree disk position of FIGURE 11. Accordingly, the position illustrated by disk 78A' corresponds to the location of the disk rotated clockwise twenty mechanical degrees and the 35 degree disk position of FIGURE 12, and the disk position illustrated by disk 78″ indicates the position of the disk at 55 mechanical degrees. Rotation of the disk 78 produces the sensor triangular voltages in the sequence illustrated in the top graph of FIGURE 12. In the variation of the shielding of each pickup sensor air gap space by the disk 78A, a sensor triangular voltage is developed for an electrical phase angle of 178 to 180 electrical degrees. This phase angle corresponds to fifty-nine to sixty degrees of disk rotation. Each pickup sensor is connected in a manner corresponding to that described in connection with the rotor position sensor for an eight pole machine so that the output of the trigger control circuit 90 provides the proper switching sequence in the switching circuit 38. Accordingly, the output of pickup sensors 151A tthrough 156A are respectively connected to the conductors 81 through 86 illustrated in FIGURE 12.

The modified trigger circuit channel 91A is illustrated in FIGURE 15 wherein a single pickup sensor signal input is utilized to trigger both the turn-on and turn-off bistable circuits illustrated in detail in FIGURE 13. The trigger control circuit 91 is modified by adding a phase inverter circuit designated 420 in FIGURE 15. The phase inverter circuit 420 is connected to the amplifier output of the trigger control circuit 91 by conductor 256A which corresponds to conductor 256 in FIGURE 13. The output of circuit 420 is of a conventional type for producing 180 electrical degree phase inversion. For example, a transistor circuit as shown in the first stage of the amplifier circuit 226 in FIGURE 13 can be used whereby the rising voltage of the pickup sensor output is converted to a proportionally falling voltage and the decreasing trailing edge of the pickup sensor voltage develops an increasing voltage. Accordingly, the operation of the phase inverter circuit 420 provides a 180 degree phase shift in the pickup sensor voltage applied to conductor 81. The trailing edge of thte pickup sensor voltage provides a rising ramp voltage corresponding to the leading edge of triangular voltage developed by the pickup sensor 153 occurring 120 electrical degrees later in the circuit 91 of FIGURE 13. The remaining circuit arrangement of the modified trigger control circuit 91A is the same as provided in the trigger control circuit 91. A further modification of the motor speed voltage source is made by varying of the motor speed voltage occurring on conductor 106. A voltage dropping element is provided by the diode 422 so that the motor speed voltage applied to the turn-off biastable is slightly lower than the motor speed voltage applied to the turn-on bistable. The diode lowers the trigger reference level in the turn-on bistable as indicated in FIGURE 16 by line 266A″ which is lower than the trigger reference level 266A′ by the amount of diode voltage drop.

The operation of FIGURE 15 is illustrated in the graph of voltage signals in FIGURE 16. The triangular voltage of the top graph is substantially the same as the triangular-shaped voltage developed in the pickup sensor 151A described in FIGURE 12. The triangular voltage is applied to the input of the turn-on bistable and the phase inverter circuit 420. The phase inverter output voltage varies inversely to the voltage applied to the input of the turn-on bistable. The turn-off bistable is normally conductive and is triggered *off* when the inverted leading edge or falling portion of the triangular voltage pulse drops below the trigger reference level indicated at 304′ in FIGURE 16. The turn-on bistable produces a positive going pulse at the instant indicated by reference line 392A and the turn-off bistable produces a positive going pulse at the instant indicated by line 394A. The first differentiator develops a positive voltage spike at instant 392A from the rising voltage at the leading edge of the turn-on bistable pulse. The second differentiator develops a positive going voltage spike at the positive going trailing edge of the turn-off bistable pulse. A corresponding output bistable pulse is produced, as illustrated at the bottom of FIGURE 16, in response to the positive voltage spikes in the manner described hereinabove. A gating pulse is produced by the output of modified channel 91A between the interval of lines 392A and 394A which is approximately 128 to 130 electrical degrees. As explained hereinabove by changing either of the trigger reference levels 266A′ or 304A′ the gating pulse length is adjusted to a predetermined length. If the diode 422 is removed from the conductor 106 in FIGURE 15 the trigger reference 266A′ produces the shorter output bistable pulse beginning with reference line 392A′.

A further modified trigger control circuit is designated 91B in FIGURE 17 which provides a phase inversion operation in the turn-off bistable portion of the trigger control circuit 91 by means including a conventional monostable multivibrator circuit 424. The circuit 424 is connected between the output of the turn-off bistable and the second differentiator circuit which are normally connected together by conductor 312 in the channel 91 of FIGURE 13. A modified motor speed voltage source 98′ is used in which the voltage level applied to the turn-on bistable decreases with motor speed rise and the voltage level applied to the turn-off bistable correspondingly increases with increased speed. This is accomplished by connecting the output pulses of the pickup of the tachometer device shown in the voltage source 98 in FIGURE 1 to both inputs of a conventional two transistor one-shot multivibrator circuit provided in circuit arrangement 104. The two multivibrator outputs are connected respectively with integrating circuits coupled to conductors 106 and 108.

The details of the monostable multivibrator circuit 424 includes the common positive power supply conductor 234 and negative power supply conductor 236 as provided in the channel 91 of FIGURE 13. The conductors 312B and 312C of FIGURE 17 correspond to the ends of conductor 312 in the channel 91. Therefore, conductor 312B is connected to the turn-off bistable output to differentiator circuit 426 including a capacitor 428 and resistor 430 provided at the input of circuit 424. The capacitor 428 is connected in series with conductor 312B and to the resistor 430. The output of the differentiator circuit 426, referred to hereinafter as a third differentiator circuit, is provided at junction 432 between the capacitor 428 and resistor 430.

A first PNP transistor 436 and a second PNP transistor 438 are provided in the monostable multivibrator circuit 424. The base electrode of transistor 436 is connected through a diode 440 to the junction 432. Diode 440 is poled to conduct voltages of a negative polarity to the base of transistor 436. A supply voltage filtering capacitor 442 is connected between power supply conductor 234 and the base of transistor 436. The capacitor 442 is also connected in parallel with a resistor 444. The emitter electrode of transistor 436 is directly connected to the power supply conductor 236. The collector of transistor 436 is connected through a current limiting resistor 446 to the negative supply conductor 236.

The transistor 438 includes an emitter electrode connected through diode 448 to the positive supply conductor 234. The diode 448 provides temperature compensation to stabilize the bias on transistor 438. The collector electrode of transistor 438 is connected to the junction 450 which is connected to one side of a resistor 452 having its other side connected to conductor 236. A resistor 454 is connected between the junction 450 and the base electrode of transistor 436 to couple the base and collector of respective transistors 436 and 438.

The output of transistor 436 is provided at its collector which is connected to capacitor 456 which interconnects the base electrode of transistor 438 to the collector of transistor 436. A junction 458 between capacitor 456 and the base of transistor 438 is connected through a resistor 460 to the negative supply conductor 236. The capacitor 456 and resistor 460 determine the discharge time-constant of the monostable circuit. The output of the monostable circuit 424 is provided on conductor 312C which is connected to the second differentiator circuit of the output bistable circuit.

The operation of the monostable multivibrator circuit 424 produces a positive going pulse in response to a negative voltage spike produced by the third differentiator circuit 426. In its stable state, transistor 438 is normally conductive and transistor 436 is normally nonconductive. The capacitor 456 is in a charged state having the indicated stored potential polarity so that the junction 458 is at a potential which is slightly less positive than the power supply voltage of conductor 234. The transistor 438 is biased conductive by current flow through the emitter-base circuit and the resistor 460. Also, since the conducting emitter-collector circuit of transistor 438 has low impedance, a voltage nearly at the potential of the supply conductor 234 is applied at junction 450. A slight voltage drop across resistors 444 and 454 produces a positive base to emitter potential at transistor 436 that biases it normally nonconductive.

The third differentiator circuit 426 produces a negative voltage spike when a negative going voltage is applied to conductor 312B. The voltage spike causes the diode 440 to conduct and lower the potential at the base of transistor 436. This causes the emitter-base circuit of transistor 436 to be forward biased to conduction in its emitter-collector circuit. The negative charged terminal of capacitor 456 is accordingly coupled through the low impedance emitter-collector circuit of transistor 436 to the positive supply conductor 234. This in effect connects the stored voltage potential of capacitor 456 in series with the power supply voltage of conductor 234. The base-emitter circuit of transistor 438 is biased with a reverse voltage polarity to trigger the transistor 438 to a nonconducting state. The positive charge of capacitor 456 begins to discharge through the resistors 460 and 446 and also the potential at junction 450 drops to a lower value. A larger voltage drop is developed across resistors 444 and 454 so that the transistor 436 is maintained in a conducting state following the application of a negative voltage spike at its base. The capacitor 456 continues to discharge at a rate primarily determined by the values of the capacitor 456 and resistor 460.

When the capacitor 456 is sufficiently discharged the base of transistor 438 becomes forward biased with respect to the emitter and the transistor is switched to a conducting state. Since the resistor 454 is coupled from the collector of transistor 438 to the base of transistor 436 this resistor produces a regenerative effect to turn off the transistor 436 when transistor 438 is biased to the conducting state. The capacitor 456 is charged with the polarity indicated through emitter-base circuit of transistor 438 and resistor 446. Since the charge potential on the capacitor 456 is less than the positive potential of the supply voltage conductor 234, the charged capacitor aids in holding the transistor 438 in a conducting state. Also, the transistor base-emitter current through resistor 460 helps maintain base drive current which maintains the transistor 438 conductive.

The above-described operation of circuit 424 produces a positive voltage pulse to the conductor 312C from the collector of transistor 436 when it is biased conductive. Normally, the potential of the conductor 312C is close to the negative potential of conductor 236 and when the transistor 436 is biased conductive, the potential rises to the value of the supply conductor 234.

The operation of the modified trigger control circuit channel 91B is explained with reference to the time graph of voltage wave shapes illustrated in FIGURE 18. A pickup sensor voltage from pickup sensor 151A illustrated in FIGURE 10 is supplied through conductor 81 to the input amplifier of channel 91B. The output of the amplifier is applied to the turn-on bistable and also directly to the turn-off bistable. This connection is shown by conductor 256B which is provided in channel 91 of FIGURE 13 by disconnecting conductor 258 and connecting conductor 256 to the turn-on bistable. The motor speed voltage on conductor 106 establishes the trigger reference level at the turn-on bistable circuit and this is indicated by line 266B' in FIGURE 18. The motor speed voltage is applied so that with increase of motor speed the turn-on bistable trigger level decreases. The motor speed voltage on conductor 108 increases with motor speed so as to increase the trigger level in the turn-off bistable 276 which is indicated by line 304B'.

The turn-on bistable circuit produces a pulse when the triangular wave shape exceeds its trigger reference potential at the instant 392B. The turn-off bistable produces a pulse earlier when the triangular wave shape voltage exceeds the trigger reference level 304B'. The turn-off bistable pulse ends at the time instant 394B which also determines the end of output bistable pulse. The leading edge of the turn-on bistable pulse produces the positive voltage spike at the output of the first differentiator circuit to initiate the output bisable pulse at the instant 392B. The output of the turn-off bistable produces positive and negative voltage spikes at the leading and trailing edges of the turn-off bistable pulse in the third differentiator circuit of channel 91B. As noted hereinabove, only the negative voltage spike is effective to trigger the monostable multivibrator circuit 424. The negative voltage spike occurs simultaneously with the trailing edge of the turn-off bistable pulse so that a positive going monostable pulse is produced which has a fixed pulse time. The positive going leading edge of the monostable multivibrator pulse produces a positive going voltage spike at the second differentiator circuit of the output bistable circuit and thereby terminates the pulse produced to the gating circuit. The pulse produced by the output bistable circuit has a pulse width of 128 to 130 electrical degrees as also described in connection with the channel 91B of FIGURE 15.

As the motor speed increase the trigger level 266B' in the turn-on bistable decreases and the trigger level 304B' in the turn-off bistable increases so that the positive voltage spike of the first differentiator and the positive going spike of the second differentiator each occur earlier and yet are spaced at the same time intervals. Accordingly, the pulse produced by the output bistable circuit occurs earlier with respect to rotor position while maintaining a constant pulse width.

In the operation of a motor power supply of the type shown in FIGURE 1, including the alternative embodiments of the rotor position sensor 74 having a pickup sensors 151A through 156A arranged as illustrated in FIGURE 10 and the trigger control circuit 90 wherein each channel is provided with the circuit illustrated in FIGURE 17, the input motor voltage is produced as illustrated in the bottom graphs of FIGURE 12. The motor 22 will be a six pole type as noted hereinabove. The orientation of the pickup sensors 151A through 156A is adjusted for the reference commutation angle as described hereinabove. The source of motor speed reference signals 98' produces separate signals that are adjusted so that one is increasing and the other is decreasing with the change in speed. The decreasing and increasing speed signals are respectively applied to the turn-on and turn-off bistables of each channel. At any given motor speed, the conduction period of the respective controlled rectifiers is provided for a 128 to 130 electrical degree time interval as illustrated in FIGURE 12. Increasing the conduction periods beyond the basic 120 electrical degree periods increases the power supply voltage and current utilized by the motor 22. The operation of the alternative embodiment described above is provided as each pickup sensor signal is produced to the trigger control circuit channels having an arrangement as described in connection with FIGURE 17.

Several other advantages are produced by having each of the respective armature phase input voltages overlapping. As a result of the overlap, for example, when the controlled rectifiers 63A, 63B and 63C are being switched *on* and just before the controlled rectifiers 61A, 61B and 61C are switched *off*, there is an overlap of the voltages across phase windings 52A and 52B. In the example noted, the input voltage to phase winding 52B is applied before the voltage being applied to phase winding 52A is removed. Accordingly, inductive voltage developed by turning off the current of phase winding 52A is provided with a discharge path. If the discharge path were not provided, the generated voltages reach a very high level so that maximum voltage rating of the controlled rectifier devices may be exceeded. A further advantage is provided by the overlapping in that reverse voltage is developed sooner across the controlled rectifiers being switched *off* by voltage which is developed by the controlled rectifiers being switched *on* and thereby decreasing the rectifier turn-off time. Another problem that is avoided by overlapping motor phase votlages is the elimination of a so-called "dead spot" where the rotor disk may be stopped at a position which is corresponding to approximately 119 degrees from the beginning of a controlled rectifier conduction period. In this instance the controlled rectifiers that are being switched off may be already switched off and the controlled rectifiers that are to be switched *on* may not be biased with a gating pulse to provide conduction through the controlled rectifier and therefore the motor armature windings may not be energized in this location of the rotor. An overlap of eight to ten electrical degrees provided in the conduction periods of the controlled rectifiers is an optimum period since if the conduction period reaches 180 electrical degrees a short circuited condition exists across the power supply input provided by alternator 28. Also, there is reactive motor current leakage, which increases at higher motor speeds, through the controlled rectifiers being switched *off* so that current continues after the gating pulse has been removed from the gate electrodes. Accordingly, the inductive voltages and currents increase the conduction period of the controlled rectifier beyond the period of the gating pulse. If a gating pulse period of more than approximately 130 electrical degrees is provided, the reactive current may extend the conduction period of a controlled rectifier to 180 electrical degrees to develop a short circuit across the motor power supply.

While the embodiments of the present invention as herein disclosed constitute preferred forms, it is to be understood that other forms might be adopted.

What is claimed is:

1. In a brushless dynamoelectric motor including a stator, a three phase armature winding for developing a plurality of pairs of armature field magnetic poles relative to said stator. and a rotor including a shaft which is rotatable in response to energization of said armature winding, an improved rotor position sensor means comprising: a disk including an arcuate side for each pair of said armature field magnetic poles of said armature winding, each of said arcuate sides being equally circumferentially spaced and formed by a circular arc having a predetermined radius with the center of said arcuate side including a minimum radial length of said disk, said disk connected to said shaft in a predetermined orientation relative to the position of said armature windings; an electrical pickup means, said electrical pickup means including six stationary inductive sensors positioned to generate electrical signals in response to variable areas of said disk passing adjacent said sensors due to the rotation of said arcuate sides, said inductive sensors being mounted in a predetermined circular arc having a radius less than said predetermined radius of said arcuate sides to thereby develop an electrical signal extending at least 180 electrical degrees and including both linearly increasing and linearly decreasing portions, said inductive sensors having a predetermined circumferentially spaced relationship such that said electrical signals produced by said six inductive sensors are equally spaced every sixty electrical degrees such that each of said inductive sensors produces the same number of electrical signals as there are pairs of said armature field magnetic poles during one complete rotation of said rotor, whereby a portion of each of said electrical signals is developed so as to overlap the linearly increasing portion of a second electrical signal and a linearly decreasing portion of a third electrical signal.

2. In a power supply for a brushless motor having a rotor and a polyphase armature winding, the combination comprising: a commutation switching circuit having pairs of semiconductor switching devices arranged to conduct current to the phase windings of said armature winding of said motor in a predetermined sequence; a position sensor means, said position sensor means including a disk means connected to said rotor and having a plurality of symmetrical side edges and a plurality of electromagnetic sensor coils responsive to said disk edges to produce sequentially occurring time varying electrical signals linearly related to the mechanical position of the motor rotor; a trigger pulse producing circuit connected between said sensor coils and said semiconductor switching devices of said commutation switching circuit, said trigger pulse producing circuit being responsive to said electrical signals to provide trigger pulses to said pairs of semiconductor switching devices for predetermined and substantially constant angular rotation of said rotor; and circuit means connected to said trigger producing circuit to vary the instant of triggering of said pairs of semiconductor switching devices relative to the instantaneous position of said rotor in response to the amplitude of said signals produced by said sensor coils while maintaining the conduction time of each of said pairs of semiconductor switching devices for said substantially constant angular rotation of said rotor.

3. In combination: a current source; a dynamoelectric machine having plural armature phase windings and a rotor member rotationally responsive to a rotating armature magnetic field; a commutation switching circuit connected between said armature phase windings and said current source including plural semiconductor switching devices for conducting bidirectional current to each of said armature phase windings; a trigger control circuit means connected to each of said semiconductor switching devices; rotor position sensing means including a position indicating member having plural symmetrically shaped and substantially identically spaced sides and a plurality of pairs of pickup sensor devices including one of said pairs for each of said armature phase windings, said rotor position sensing means producing periodic ramp voltages to said trigger control circuit means, said ramp voltages being amplitude responsive to the rotational movement between said position indicating member and said plurality of pairs of pickup sensor devices; means connected to said dynamoelectric machine for producing a load responsive reference voltage to said trigger control circuit means; circuit means included in said trigger control circuit means for comparing the amplitude of said ramp voltages with the amplitude of said load reference voltage and producing trigger pulses of predetermined duration relative to a predetermined arcuate movement of said rotor, said trigger pulses of predetermined duration occurring earlier with increase of motor load and corresponding change of said load reference voltage thereby advancing conduction of current to the armature phase windings relative to the rotational position of said rotor member to compensate for distortion of the rotating armature magnetic fields.

4. A brushless motor commutator system having a variable commutation control comprising: a three phase armature winding having a predetermined number of poles; switching circuit means for periodically supplying current to said windings; a rotor shaft disk means including uniformly arcuate peripheral edges and having one edge for each pair of motor poles; rotor sensing means including six pickoff sensors each being responsive to rotation of the rotor disk peripheral edges so as to sequentially produce linear time varying pickoff signals every sixty electrical degrees; control circuit means responsive to a predetermined sequence of said pickoff signals for producing control signals to said switching circuit; and motor speed responsive means for producing a variable reference signal, said variable reference signal being connected to said control circuit means whereby the timing of said control signals relative to the position of the motor rotor is varied to vary the instant when current is supplied to each phase winding of said three phase armature winding by said switching circuit means.

5. A brushless motor commutator system having a variable commutation control comprising: a commutation switching circuit; a rotor shaft disk means; a plurality of shaft pickoff sensors responsive to the position of said disk means for producing linear time varying signals corresponding to the rotational position of said disk means; a variable reference signal source controlled by at least one motor operating characteristic; a control circuit means including a plurality of separate trigger pulse circuits each respectively having two inputs respectively connected to signals developed by two of said pickoff sensors, said trigger pulse circuits further including outputs connected to said commutation switching circuit; each of said trigger pulse circuits including a pair of first and second bistable circuit means and a bistable multivibrator circuit means, each of said pickoff sensors being connected respectively to said first bistable circuit means of one of said trigger pulse circuits and to said second bistable circuit means of another trigger pulse circuit, said bistable multivibrator circuit means having first and second inputs respectively connected to said first and to said second bistable circuit means, said output of said bistable multivibrator circuit means providing trigger control pulses connected to said commutation switching circuit, one of said pair of bistable circuit means being responsive to one of said pickoff signals to initiate said trigger control pulses and the other bistable circuit means being responsive to a second of said pickoff signals to terminate said trigger control pulses, both of said pair of bistable circuit means being further connected to said variable reference signal, and each of said pair of bistable circuit means switching from one bistable state to a second bistable state when the respective pickoff signals reach a predetermined level of said reference signal, whereby the duration of said trigger control pulses is determined by the interval between the signals produced by said two pickoff sensors while being shifted with respect to rotor position in response to changes in the level of said reference signal.

6. A brushless motor commutator power supply having a variable commutation control comprising: a motor having a polyphase winding and a rotor; a shaft position sensing means including means for generating triangular shaped voltages each including symmetrical leading and trailing edges responsive to the rotation of the motor rotor; a source of electrical power; a commutation switching network including groups of controlled rectifiers having control electrodes and output electrodes, said output electrodes connected to said power source for supplying multiphase power to said polyphase winding; a plurality of trigger control circuits, each of said trigger control circuits being connected intermediate one of said sources of triangular shaped voltage and the control electrodes of one group of said controlled rectifiers, each of said trigger control circuits including first and second bistable circuits and a bistable multivibrator circuit controlled by the outputs of said first and second bistable circuits, a source of variable D.C. reference voltage connected to each of said bistable circuits, said first and second bistable circuits being respectively triggered in response to said leading edge and said trailing edge of said triangular shaped voltage and the amplitude of said D.C. reference voltage, whereby a pulse is produced from said bistable multivibrator circuit to trigger the controlled rectifiers of one of said groups for a predetermined conduction time, and the beginning of said predetermined time conduction of each of said controlled rectifier groups being varied relative to the position of said motor rotor by variations of said D.C. reference voltage.

7. A brushless motor power supply having a variable commutation control comprising: a motor having a polyphase winding and a rotor; a shaft positioned sensing means including plural sources for generating a plurality of evenly spaced triangular shaped voltages with each of said voltages including symmetrically leading and trailing edges in response to the rotation of the motor rotor; a source of electrical power; a commutation switching network including groups of controlled rectifiers having control electrodes and output electrodes, said output electrodes connected to said source of electrical power for supplying three phase power to said polyphase winding; a plurality of trigger control circuits, each of said trigger control circuits being respectively connected intermediate one of said sources of triangular shaped voltage and said control electrodes of one of said groups of controlled rectifiers, each of said trigger control circuits including first and second bistable circuits and a bistable multivibrator circuit; said bistable multivibrator circuit producing a pulse controlled by said first and second bistable circuits; a source of variable D.C. reference voltage connected to each of said bistable circuits; said first and said second bistable circuits being respectively triggered in response to said leading edge and to said trailing edge of said triangular shaped voltage when the respective leading and trailing edges reach the amplitude of said D.C. reference voltage, said pulse from said bistable multivibrator circuit of each of said trigger control circuits triggering one group of said controlled rectifiers to conduction during each 360 electrical degree cycle of three phase power supplied to said polyphase winding; and means for producing a predetermined voltage drop connected intermediate said source of variable D.C. reference voltage and one of said first and second bistable circuits to produce a predetermined pulse duration greater than one hundred twenty electrical degrees from said bistable multivibrator circuits, whereby the time of conduction of each group of controlled rectifiers of said commutation switching network is varied relative to the position of said motor rotor by variation of said D.C. reference voltage while the predetermined pulse duration of said pulse produced from said bistable multivibrator circuit remains substantially constant.

8. A brushless motor power supply having a variable commutation control comprising: a motor having a polyphase winding and a rotor including a shaft; a shaft position sensing means including a plurality of sources of triangular shaped voltages including symmetrical leading and trailing edges, said triangular shaped voltages being produced sequentially in overlapping relationship with two other triangular shaped voltages in response to the rotation of said motor rotor; a source of electrical power; a commutation switching network including six groups of controlled rectifiers respectively including control electrodes and output electrodes, said output electrodes of each of said groups of controlled rectifiers connected to said source of electrical power to develop a three phase voltage output for said polyphase windings; six trigger control circuits, each of said trigger control circuits being respectively connected intermediate one of said sources of triangular shaped voltages and the control electrodes of one of said groups of controlled rectifiers, each of said trigger control circuits including first and second bistable comparator circuits respectively having an output and an output bistable circuit, said output bistable circuit being controlled by said respective outputs of said first and second bistable comparator circuits, each of said trigger control circuits further including a phase inverter circuit connected in series with one of said first and second bistable comparator circuits; a source of variable D.C. reference voltage connected to said first and second bistable comparator circuits; means for producing a predetermined voltage drop connected intermediate said source of variable D.C. reference voltage and one of said first and second bistable comparator circuits to provide an adjusted D.C. reference voltage; said first and second bistable comparator circuits being triggered respectively to develop outputs changing between first and second voltage levels when said leading and trailing edges of said triangular shaped voltage respectively reach values corresponding to the amplitudes of said D.C. reference voltage and of said adjusted D.C. reference voltage, said output bistable circuit producing an output pulse having a predetermined duration determined by the time between said changes in voltage levels of the outputs of said first and second bistable comparator circuits for triggering and controlling the conduction time of one of said groups of controlled rectifiers, said output bistable circuit pulses of each of said trigger control circuits overlapping the pulses produced by two other output bistable circuits such that the beginning of one output bistable circuit pulse occurs before the end of a second output bistable circuit pulse while a third output bistable circuit pulse is at a mid portion of its pulse width.

9. In a brushless electric motor including a stator having a plurality of armature windings for producing a plurality of pairs of armature field poles, and a rotor rotatable in response to energization of said armature windings, an improved rotor position sensing means comprising: a flat disk including a peripheral edge rotatably mounted and driven in response to rotation of said rotor, said peripheral edge including plural arcuate sides with equal spacing provided between said plural arcuate sides, a separate arcuate side being formed for each of said pair of armature field poles produced by said armature windings, said arcuate sides including variable radial lengths extending to a center point of said flat disk in which said variable radial lengths are symmetrically disposed about a center radial length; a plurality of pairs of electrical sensors mounter on a stationary support adjacent said flat disk including one of said pairs for each of said plurality of armature windings, said plurality of pairs of electrical sensors arranged in a circle including predetermined circumferential spacings so that only one of said center radial lengths of said arcuate sides is aligned with one of said electrical sensors at equally spaced rotational positions of said flat disk, said plurality of pairs of electrical sensors sequentially generating linearly variable electrical signals in response to said arcuate sides rotating adjacent thereto whereby each revolution of said flat disk develops a group of equally spaced electrical signals equal to the number of said plurality of armature windings multiplied by the number of said pairs of armature field poles.

10. In a brushless electric motor including a stator, a plurality of armature windings, and a rotor including a shaft which is rotatable in response to energization of said armature windings, an improved rotor position sensing means comprising: a disk having an outer edge and a center portion connected to said shaft for rotation therewith, a plurality of equally circumferentially spaced arcuate sides formed on said outer edge including variable radial lengths extending between said edge and the center of said disk; a plurality of stationary electrical sensors mounted adjacent to said disk and disposed in a circle having the center thereof aligned with the center of said disk, each of said electrical sensors generating a linearly variable electrical signal in response to variable areas of said disk passing adjacent thereto, said electrical signal including first and second minimum values which are substantially equal and a maximum value which is equally spaced between said first and second minimum values when each of said arcuate sides is rotated adjacent said sensor, said electrical sensors being circumferentially spaced with respect to each other electrical sensor so as to generate equally spaced electrical signals which are in a predetermined overlapping relationship, said overlapping relationship formed by each of said electrical signals respectively developing said first minimum value when a previously generated electrical signal is at a maximum value and subsequently developing said second minimum value when a later generated electrical signal is at a maximum value.

11. A control system for a dynamoelectric machine having a stator winding a rotor, said control system comprising: a source of electrical power; a commutation control circuit including a plurality of switching devices connected between said source of electrical power and said stator winding, said switching devices of said commutation control circuit operative to connect said stator winding in a positive and negative sense to said source of power during predetermined conduction periods and further operative to periodically disconnect said source of power and said stator winding whereby current is commutated in said stator winding; a position sensing means for developing an electrical signal which is indicative of the instantaneous relative positions of said rotor and said stator winding, an electrical control circuit connected between said position sensing means and said commutation control circuit for determining a switching sequence of said switching devices including said predetermined conduction periods; said electrical control circuit operative to maintain a predetermined commutation angle between the position of said rotor and the instant that power is connected to said stator winding by said commutation control circuit, means for developing a commutation angle control signal which is a function of a condition of operation of said motor, and means included in said electrical control circuit connected with said means for developing said commutation angle control signal, said last named means operative to vary said commutation angle in response to said commutation angle control signal without substantially varying said predetermined conduction periods of said switching devices.

12. A control system for an electric motor having a polyphase stator winding and a rotor comprising: means providing a plurality of magnetic poles on said rotor; a source of electrical power; a commutation control circuit including a plurality of semiconductor switches connected between said source of electrical power and said polyphase stator winding, said semiconductor switches operative to energize said polyphase stator winding from said source of electrical power in a positive and negative sense during predetermined conduction periods and further operative to periodically disconnect at least a part of said stator winding and said source of electrical power whereby current is commutated in said polyphase stator winding; position sensor means responsive to the position of said rotor for developing ramp voltages the amplitude of which are indicative of the instantaneous position of said magnetic poles on said rotor with respect to said stator; means for providing a variable magnitude control voltage; a trigger control circuit including first and second inputs and an output, said first and second inputs connected with said means for providing a control voltage and with said position sensor means and said output connected with said commutation control circuit, said trigger control circuit operative to control the switching sequence of said commutation control circuit in response to the relative magnitudes of said ramp voltage and said control voltage, and said trigger control circuit further operative to vary the time of occurrence of energization of said stator winding relative to the instantaneous position of said magnetic poles on said rotor without varying said predetermined conduction periods of said semiconductor switches.

References Cited

UNITED STATES PATENTS

| | | | |
|---|---|---|---|
| 3,153,185 | 10/1964 | Hummel | 318—254 |
| 3,214,663 | 10/1965 | Kreutzer | 318—254 XR |
| 3,229,179 | 1/1966 | Hetzel | 318—254 XR |
| 3,280,396 | 10/1966 | Beck et al. | 318—138 |
| 3,281,630 | 10/1966 | Liang | 318—138 |
| 3,305,713 | 2/1967 | Ikegami | 318—138 |
| 3,309,592 | 3/1967 | Faure | 318—138 |
| 3,418,550 | 12/1968 | Kolatorowicz et al. | 318—254 |

G. R. SIMMONS, Primary Examiner

U.S. Cl. X.R.

318—254